US009527195B1

(12) United States Patent
Deane

(10) Patent No.: US 9,527,195 B1
(45) Date of Patent: Dec. 27, 2016

(54) APPARATUS FOR REMOVING A COUPLER FROM TUBING

(71) Applicant: Thomas C. Deane, Redlands, CA (US)

(72) Inventor: Thomas C. Deane, Redlands, CA (US)

( * ) Notice: Subject to any disclaimer, the term of this patent is extended or adjusted under 35 U.S.C. 154(b) by 832 days.

(21) Appl. No.: 13/665,738

(22) Filed: Oct. 31, 2012

Related U.S. Application Data

(60) Provisional application No. 61/681,360, filed on Aug. 9, 2012.

(51) Int. Cl.

| | |
|---|---|
| ***B23P 19/04*** | (2006.01) |
| ***B25B 27/00*** | (2006.01) |
| ***B25B 7/00*** | (2006.01) |

(52) U.S. Cl.
CPC *B25B 27/00* (2013.01); *B25B 7/00* (2013.01)

(58) Field of Classification Search
CPC ................ B25B 5/14; B25B 7/00; B25B 7/02; B25B 7/04; B25B 7/22; B25B 9/00; B23P 19/00
USPC ......... 29/268, 267, 263, 278; 81/426, 424.5, 81/302
See application file for complete search history.

(56) References Cited

U.S. PATENT DOCUMENTS

| | | | | |
|---|---|---|---|---|
| 4,522,339 | A | 6/1985 | Costa | |
| 4,530,142 | A | 7/1985 | Schiffer | |
| 4,769,891 | A | 9/1988 | Corral | |
| 5,513,425 | A | 5/1996 | Williams | |
| 6,581,262 | B1 | 6/2003 | Myers | |
| 6,904,660 | B2 | 6/2005 | English | |
| 7,617,580 | B2 | 11/2009 | Ellis | |
| 7,918,002 | B2 | 4/2011 | Kissel | |
| 8,308,756 | B1 | 11/2012 | Deskiewicz | |
| 2011/0167612 | A1* | 7/2011 | Marshall .................. | B25B 7/00 29/428 |
| 2012/0260481 | A1* | 10/2012 | Hutchfield ............ | B25B 27/146 29/268 |

* cited by examiner

*Primary Examiner* — Monica Carter
*Assistant Examiner* — Nirvana Deonauth
(74) *Attorney, Agent, or Firm* — Loza & Loza, LLP; Stephen D. Burbach

(57) ABSTRACT

An apparatus for removing a coupler from tubing includes a pair of pivotally coupled elongated members. Proximal sections of the elongated members serve as handles, while other sections of the elongated members comprise structures for engaging the coupler and the tubing. The apparatus may be used, for example, to remove a coupler from flexible irrigation tubing.

24 Claims, 48 Drawing Sheets

APPARATUS FOR REMOVING A COUPLER FROM TUBING

CLAIM OF PRIORITY

This application claims the benefit of and priority to commonly owned U.S. Provisional Patent Application No. 61/681,360, filed Aug. 9, 2012, the disclosure of which is hereby incorporated by reference herein.

BACKGROUND

Field

This application relates generally to hand-held tools and, more specifically but not exclusively, to an apparatus for removing a coupler from tubing.

INTRODUCTION

Some types of irrigation systems employ flexible plastic tubing and plastic couplers. Upon installation, the tubing is cut to length per the spatial requirements and positioned to carry water to designated areas of the landscape (e.g., the locations of vegetation). In general, at various points in the irrigation system, the couplers are used to couple one section of tubing to another section of tubing or to another component of the irrigation system (e.g., a sprinkler head). For example, a tubing-to-tubing coupler may connect two sections of tubing (e.g., via a "straight" or "elbow" configuration), three sections of tubing (e.g., via a "T" configuration), and so on.

In some cases, the couplers are designed for ease of installation. That is, a coupler may employ a slide-in or slide-over mechanical coupling mechanism that facilitates structural connectivity and a watertight seal between the tubing and the coupler, as opposed to a more permanent type of coupling (e.g., glue-based or screw-based) that is commonly used for permanent underground irrigation systems.

As one example, a compression coupler includes an opening with an internal flange that facilitates easy insertion of the tubing into the opening but tends to prevent the tubing from being easily pulled back out of the opening. FIG. 1A illustrates an example of a "T" compression coupler 102 into which a section of tubing 104 is inserted. When viewed from the outside looking sideways at a given opening of the coupler 102 (e.g., when viewed from the right-hand side of FIG. 1A), the opening is tapered inward such that the diameter of the opening acts as a "funnel" to guide the tubing into the coupler. For purposes of illustration, FIG. 1A depicts this taper and other aspects of the interior of the coupler 102. An inward protrusion 106 that defines the taper is illustrated for the right-side opening of the coupler 102. An inner circumferential edge 108 of each tapered coupler opening is relatively sharp such that this feature firmly grips the tubing 104 without puncturing the tubing 104. Such an edge 108 is illustrated for the right-side opening of the coupler 102. This gripping action is enhanced when water enters and pressurizes the irrigation system, causing the tubing 104 to slightly swell outward against the circumferential edge 108, thereby tending to prevent accidental disconnection of the tubing 104 from the coupler 102 due to the compression of the tubing 104 within the coupler 102.

As another example, an expansion coupler includes tube-like extensions, each of which includes an external tapered flange that facilitates easy placement of the tubing over the extension but tends to prevent the tubing from being easily pulled back off of the extension. FIG. 1B illustrates an expansion coupler 110 that includes two tapered flanges 112, where the left flange 112 is not shown since it is covered by tubing 114. Here, the tubing 114 is expanded slightly upon being forced over the taper of the flange 112, thereby facilitating a watertight seal. The innermost end (i.e., the outer circumferential feature) of each flange 112 comprises a relatively sharp edge 116, thereby tending to prevent accidental disconnection of the tubing 114 from the coupler 110 via expansion of the tubing 114 over the coupler 110. When viewed from the outside looking sideways at a given end of the coupler 110 (e.g., when viewed from the right-hand side of FIG. 1B), the flange 112 is tapered outward such that the flange 112 acts as an external "funnel" to guide the tubing 114 onto the coupler 110. The circumferential edges 116 are relatively sharp such that these features firmly grip the inner surface of the tubing 114 without puncturing the tubing 114. Since the left-hand side flange 112 is covered by the tubing 114, only the edge 116 for the right-hand side flange 112 is depicted in FIG. 1B. This gripping action tends to prevent accidental disconnection of the tubing 114 from the coupler 110 due to the expansion of the tubing 114 over the flange 112.

In scenarios such as those described above where couplers are designed for ease of installation, it is generally possible for a person to remove the tubing from the coupling. This is advantageous in some cases, since it allows the irrigation system to be more easily reconfigured and facilitates replacement of a section of tubing, if needed.

In practice, manually disconnecting a coupler from a section of tubing may result in damage to the coupling, damage to the tubing, bodily injury to the person performing this task, or a combination of the above. For example, a conventional technique for removing a coupler from a section of tubing involves a person gripping the coupler in one hand and the section of tubing in the other hand, and pulling these components apart. In some cases, relatively strong physical force may be needed to pull the components apart. Consequently, such a technique may only work well for a person who has sufficient upper-body strength, a strong grip, and little or no arthritis within the upper body or hands. Moreover, even if a person has sufficient strength to pull the components apart, if the coupler is suddenly released from the tubing, this action may result in an outward flailing of one or both arms, whereby bodily injury may occur to the person (e.g., pulled muscles, tendons, etc.). Additionally, in locations without sufficient distance from nearby people or structures (trees, walls, houses, etc.), bodily injury may be incurred to nearby people and/or additional injuries may be incurred by the person removing the coupler from the tubing as a result of impact with nearby people or structures.

If a person lacks the physical ability to remove a coupler via bare hands, one or two tools consisting of any combination of pliers, channel locks, vise grips, screwdrivers, knives, a mounted vise, etc., may be utilized to remove the coupler from the tubing. In practice, however, the use of such a tool may result in damage to the coupling, damage to the tubing, bodily injury to the person performing this task, or a combination of the above. Damage to the coupler and/or the tubing may require replacement of the damaged coupler and/or shortening of the tubing (e.g., by trimming off the damaged end of the tubing), either of which results in wasted time and/or expense. Similarly, bodily injury to the person removing the coupler and/or other nearby people may result in wasted time and/or expense.

The use of hand tools for assembling drip irrigation systems is well known. For example, various combinations of pliers-type cutters, hole punches, knives, pliers, and other hand tools are readily available on the market to trim drip irrigation tubing to the correct length prior to inserting the tubing into a coupler. Examples of hand tools specifically designed for use during the installation of drip irrigation systems are disclosed in the following U.S. Patents:

Devices related to irrigation tubing are disclosed in U.S. Pat. No. 4,530,142, U.S. Pat. No. 4,769,891, U.S. Pat. No. 5,513,425, U.S. Pat. No. 6,904,660, and U.S. Pat. No. 7,617,580. Devices related to irrigation emitters are disclosed in U.S. Pat. No. 4,522,339 and U.S. Pat. No. 6,581,262. While the disclosed tools may fulfill their respective particular objectives and requirements, none of these tools facilitate efficient removal of a coupler from tubing.

SUMMARY

A summary of several sample aspects of the disclosure and embodiments of an apparatus constructed according to the teaching herein follows. For convenience, the terms "apparatus" and "device" may be used interchangeably herein. It should be appreciated that this summary is provided for the convenience of the reader and does not wholly define the breadth of the disclosure. For convenience, one or more aspects or embodiments of the disclosure may be referred to herein simply as "some aspects" or "some embodiments."

The disclosure relates in some aspects to an apparatus for removing a coupler from tubing. In some aspects, the apparatus includes a pair of handles and mechanisms for engaging the coupler and the tubing whereby, in different embodiments, either closure of the handles or opening of the handles results in the coupler and tubing being separated from one another.

The disclosure relates in some aspects to an apparatus comprising two elongated members that are pivotally attached to one another. In this way, each elongated member defines a proximal handle section, a distal section, and an intermediate section.

In some embodiments, the mechanisms for engaging the coupler and the tubing are located at the distal section of the apparatus. In this case, the elongated members are pivotally attached to one another at the intermediate section (e.g., near the center) of each elongated member.

For example, a distal section of a first one of the elongated members may comprise a cradle member for engaging (e.g., cradling) the coupler. The cradle member defines an opening that extends to an edge of the cradle member. In this way, the tubing and coupler may be placed relative to the cradle member such that the end of the coupler where the tubing emerges from the coupler opening will engage a surface of the cradle member and such that the tubing extends through the opening.

In addition, a distal section of a second one of the elongated members may comprise a clamp member for engaging (e.g., clamping) the tubing. The tubing is placed between a lower wall and a rotating member of the clamp member such that the tubing is effectively clamped between these components.

Upon closing the handle sections of the above elongated members toward one another, the cradle member and clamp member are forced apart. Here, the engagement of the coupler with the surface of the cradle member and the engagement of the clamp member with the tubing causes the coupler to be pulled off of the tubing as the cradle member and the clamp member are forced apart.

In some embodiments, the mechanisms for engaging the coupler and the tubing are located at an intermediate section of the apparatus. In this case, first and second elongated members are pivotally attached to one another at the distal sections of the elongated members. In addition, an intermediate section of the first elongated member may comprise a cradle member for engaging the coupler, while an intermediate section of the second elongated member may comprise a clamp member for engaging the tubing. In this case, upon opening the handle sections of the first and second elongated members away from one another, the cradle member and clamp member are forced apart, thereby causing the coupler to be pulled off of the tubing.

BRIEF DESCRIPTION OF THE DRAWINGS

These and other aspects of the disclosure will be more fully understood when considered with respect to the following detailed description, the appended claims, and the accompanying drawings, wherein:

Figure 1A:
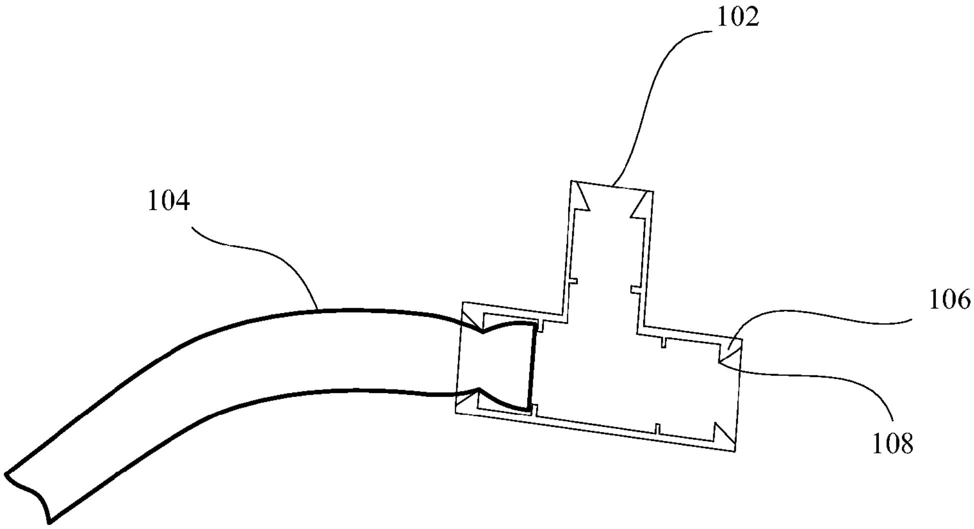
FIG. 1A is a simplified diagram of a compression coupler into which a section of tubing is inserted.

In accordance with common practice, the various features illustrated in the drawings are generally not drawn to scale. Accordingly, the dimensions of the various features may be arbitrarily expanded or reduced for clarity. In addition, some of the drawings may be simplified for clarity. Thus, the drawings typically do not depict all of the components of a given apparatus or method. Finally, like reference numerals may be used to denote like features throughout the specification and figures. To avoid unnecessary repetition in cases where the same reference numeral is used in different figures, the reference numbers are not always discussed in the description of each of the figures.

DETAILED DESCRIPTION

The description that follows sets forth one or more illustrative embodiments. It will be apparent that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

Several embodiments of apparatuses for removing a coupler from tubing in accordance with the teachings herein are described below. For purposes of illustration, these embodiments may be presented in the context of removing a compression coupler from tubing. It should be appreciated, however, that the teachings herein are also applicable to the removal of an expansion coupler from tubing.

FIGS. 2-12B illustrate an embodiment of an apparatus 200 for removing a coupler from tubing for a case where mechanisms for engaging a coupler and tubing are located at a distal section of the apparatus 200. These figures depict various views of the apparatus 200 as described below.

Figure 2:
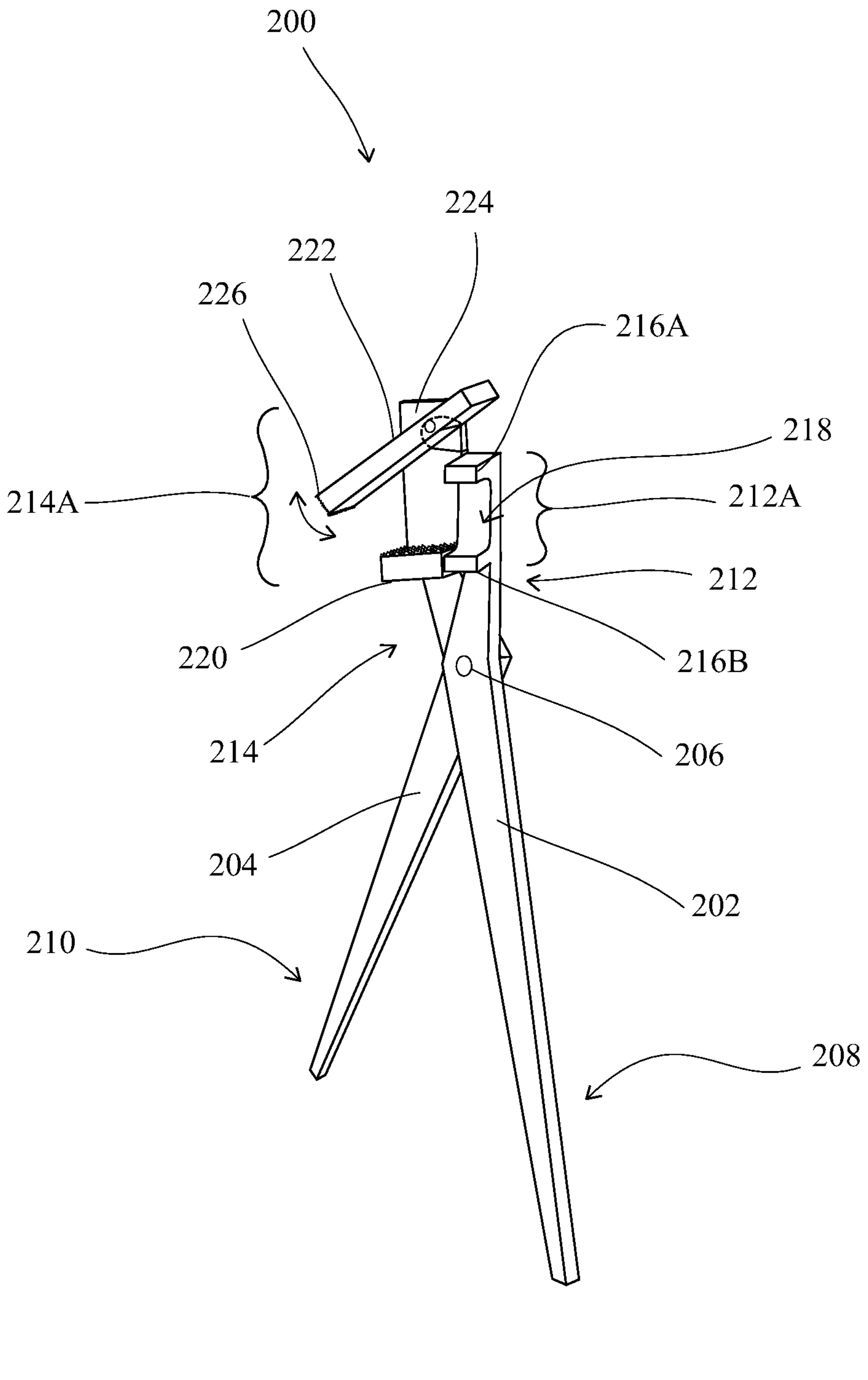
FIGS. 2-12B are simplified diagrams illustrating an embodiment of an apparatus for removing a coupler from tubing.

FIG. 2 illustrates a perspective view of the apparatus 200 where the right-hand side of the apparatus 200 has been rotated out from the page slightly. The apparatus 200 includes a first elongated member 202 and a second elongated member 204.

The first elongated member 202 and the second elongated member 204 are pivotally coupled at pivot point 206. For example, a pivot-based coupling located at the pivot point 206 serves to hold the elongated members 202 and 204 together while enabling relative rotation between the elongated members 202 and 204.

A pivot-based coupling at the pivot point 206 as depicted in FIG. 2 may be implemented in various ways. For example, in some embodiments, each of the first elongated member 202 and the second elongated member 204 comprise a hole through which a pivot pin passes. In this case, the pivot pin may comprise structure that retains the pivot pin in place. For example, the pivot pin may comprise a rivet, a bolt and screw, or some other suitable structure. In some embodiments, the pivot pin protrudes from one of the elongated members and passes through a hole in the other elongated member. Again, the pivot pin may comprise structure that retains the pivot pin in place (e.g., an outward expanding element such as a head, a rivet flange, a nut, etc., that serves to hold the two elongated members 202 and 204 together while enabling relative rotation of the elongated members 202 and 204). It should be appreciated that other coupling mechanisms other than a pivot pin-based coupling may be employed at pivot point 206 in an apparatus for removing a coupler from tubing consistent with the teachings herein.

In some aspects, the pivot point 206 between the elongated members 202 and 204 serves to define different sections of each of the elongated members 202 and 204. For example, proximal sections 208 and 210 of the elongated members 202 and 204, respectively, effectively provide handles that may be used by a person to operate the apparatus 200. In addition, a distal section 212 of the elongated member 202 comprises a cradle member 212A for engaging a coupler (not shown in FIG. 2). Also, a distal section 214 of the elongated member 204 comprises a clamp member 214A for engaging tubing (not shown in FIG. 2).

The cradle member 212A includes arms 216A and 216B that define an opening 218 of the cradle member 212A. As discussed in more detail below (e.g., in FIG. 3), tubing is placed within the opening 218 and the cradle member 212A holds a coupler in place while the coupler is being removed from the tubing.

The clamp member 214A comprises a lower wall 220 that cooperates with a rotating member 222 to clamp onto the tubing while the coupler is being removed from the tubing. The rotating member 222 is pivotally coupled to a side wall 224 of the clamp member 214A, such that a distal end 226 of the rotating member 222 is able to rotate (as indicated by the double-arrow line in FIG. 2) toward or away from the lower wall 220.

Figure 3:
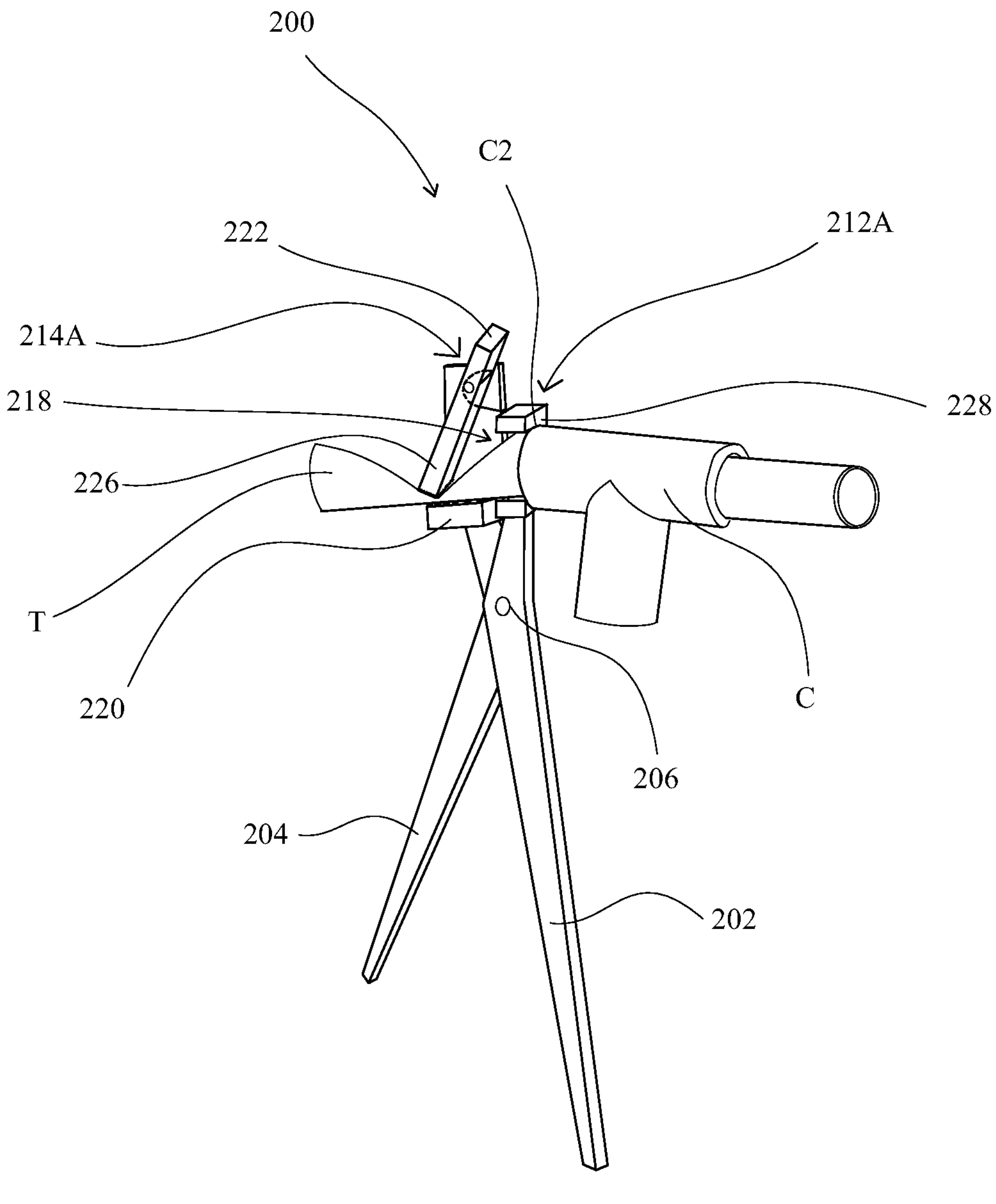

FIG. 3 illustrates, in a simplified manner, an example of how the apparatus 200 may engage a coupler C and tubing T that are initially coupled together. In particular, this figure shows how the clamp member 214A (see FIG. 2) engages the tubing T and the cradle member 212A (see FIG. 2) engages the coupler C while the coupler C is being removed from the tubing T.

Here, it may be seen that the opening 218 is sized such that the tubing T may be placed within the opening 218 from the side of the cradle member 212A, thereby enabling the apparatus 200 to be used to remove a coupler C in an irrigation system that is already installed. In addition, the opening 218 is sized such that the left-most end C2 of the coupler C does not pass through the opening 218. Rather, as the tubing T is pulled to the left in the view of FIG. 3 (as discussed below), the end C2 engages a right-hand surface 228 (e.g., including at least a portion of the right-hand surfaces of the arms 216A and 216B) of the cradle member 212A.

In FIG. 3, the distal end 226 of the rotating member 222 has been rotated against the tubing T such that the tubing T is forced against the lower wall 220. In this way, the clamp member 214A securely clamps onto the tubing T to facilitate removal of the coupler C. Although the tubing T is depicted in FIG. 3 as being significantly compressed by this clamping action, in some cases (e.g., where the tubing T is stiffer), the tubing T may only be slightly compressed by such clamping action.

Figure 4:
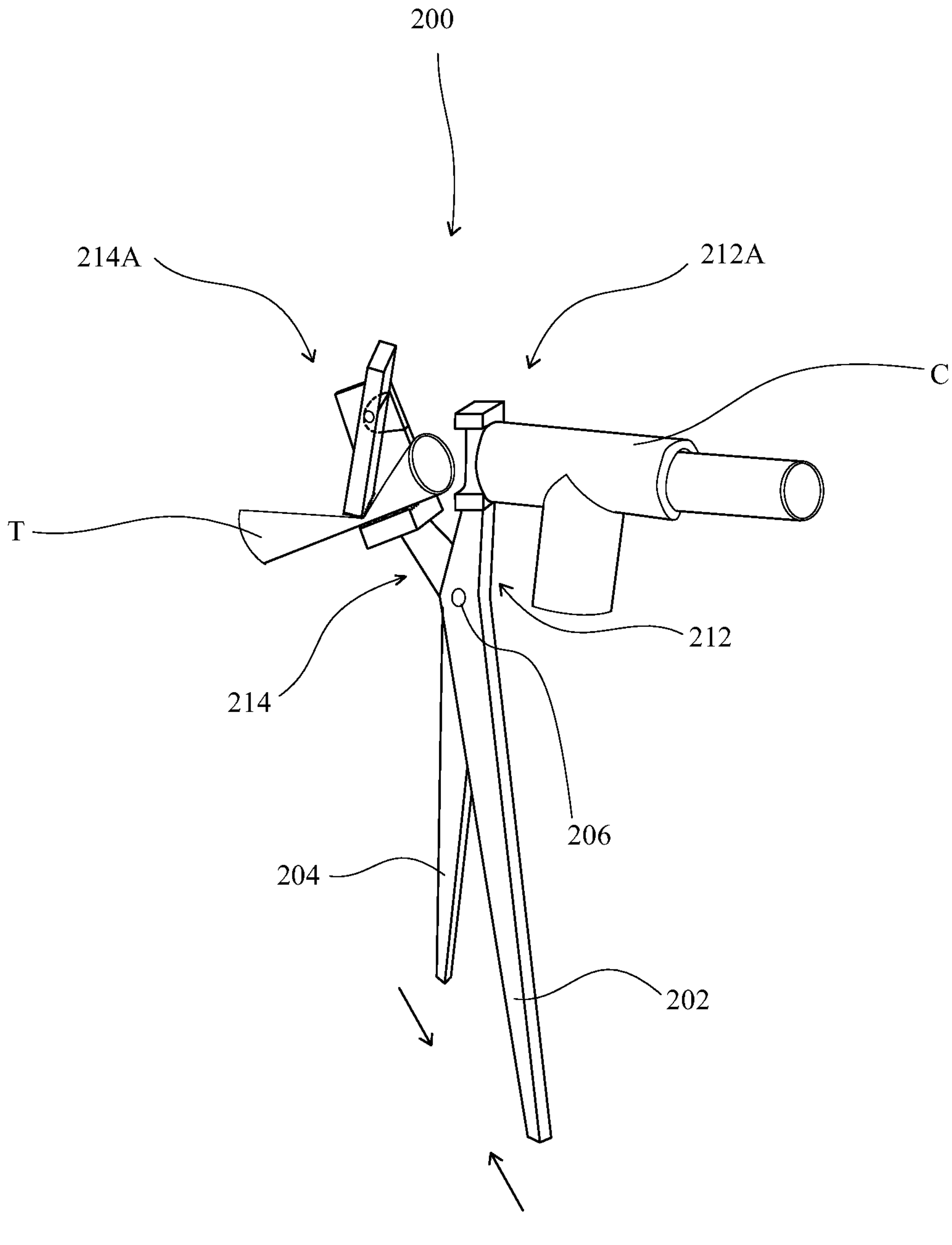

FIG. 4 illustrates the final act of removing the coupler C from the tubing T. Here, the handle sections of the elongated members 202 and 204 are compressed (e.g., pulled) toward one another (as indicated by the pair of arrows). Typically, the act of compressing the handles together would be performed by a person gripping the handles with one hand and forcing the handles together.

The action of compressing the handles together, in turn, causes the distal sections 212 and 214 to move apart (e.g., as depicted in FIG. 4). Since the tubing T is firmly clamped by the clamp member 214A and the coupler C is prevented from moving to the left by the cradle member 212A, the tubing T is pulled out of the left-hand side opening of the coupler C, thereby removing the coupler C from the tubing T.

For purposes of illustration, the coupler C is depicted in FIG. 4 as remaining engaged with the cradle member 212A. It should be appreciated that in the absence of the coupler C being held in place in this manner, however, the coupler C would not remain engaged with the cradle member 212A once the tubing T is pulled out of the left-hand side opening of the coupler C.

With the above in mind, various structural and operation details of the apparatus 200 will now be described with reference to FIGS. 5-12B.

Figure 5:
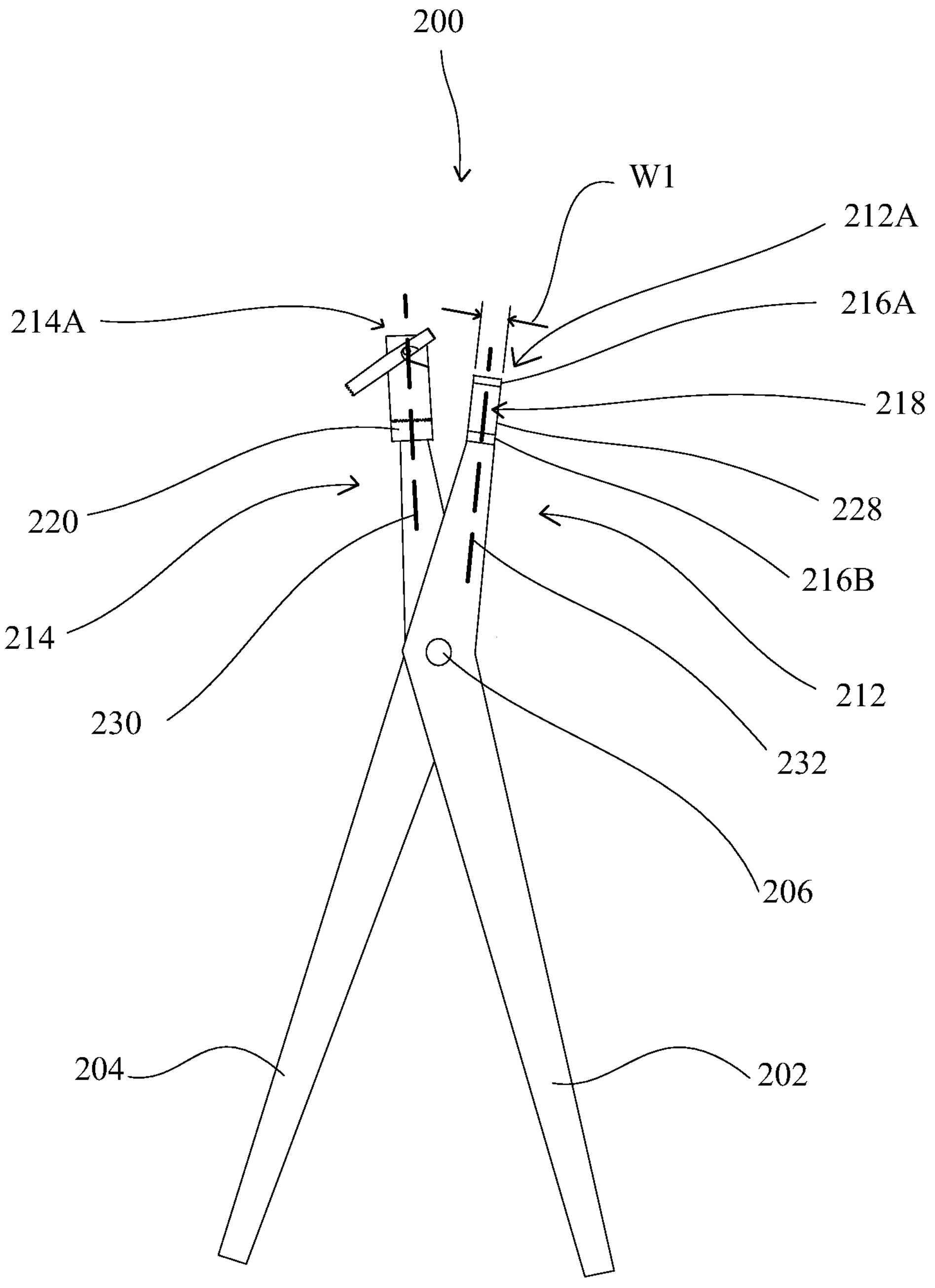

FIG. 5 illustrates a front-side view of the apparatus 200. From this view, it may be observed that at least a portion of the lower wall 220 is oriented substantially (e.g., approximately or exactly) perpendicular to a longitudinal axis 230 of the distal section 214. In addition, it may be observed that the surface 228 of the cradle member 212A is oriented substantially (e.g., approximately or exactly) parallel to a plane that lies along a longitudinal axis 232 of the distal section 212 and that is aligned substantially (e.g., approximately or exactly) parallel with the axis of the pivot point 206. That is, from the view of FIG. 5, the plane is substantially (e.g., approximately or exactly) perpendicular to the page. It should be appreciated, however, that these features of the apparatus 200 may be oriented in other ways in other embodiments consistent with the teachings herein.

In the example of FIG. 5, the width W1 of the cradle member 212A is shown as being approximately equal to the width of the distal section 212 (from this view). It should be appreciated, however, that the width W1 of all or a portion of the cradle member 212A may be less than or greater than the width of the distal section 212. For example, the top arm 216A and the bottom arm 216B of the cradle member 212A (e.g., that define the opening 218) may be narrower or wider (from this view) in different embodiments.

Also, FIG. 5 illustrates that the pivot point 206 for the elongated members 202 and 204 is located in respective intermediate sections (i.e., between the respective distal and proximal sections) of the elongated members 202 and 204. As discussed above, in various embodiments, a pivot pin located at pivot point 206 may extend through a hole in an intermediate section of the elongated member 202 and/or through a hole in an intermediate section of the elongated member 204. Also, in various embodiments, a pivot pin located at pivot point 206 may protrude from an intermediate section of the elongated member 202 or protrude from an intermediate section of the elongated member 204.

In the example of FIG. 5, the pivot point 206 is located approximately ⅓ of the distance from the top of the apparatus 200. It should be appreciated that in other embodiments, the pivot point 206 may be higher or lower depending on, for example, the amount of leverage and throw that is desired.

Figure 6A:
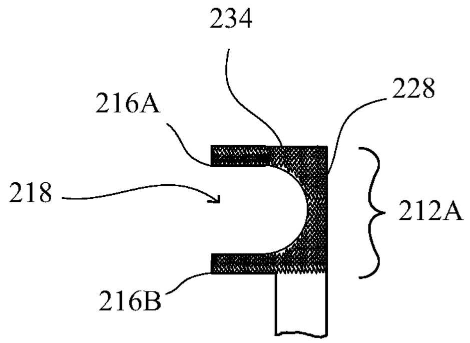
Figure 6B:
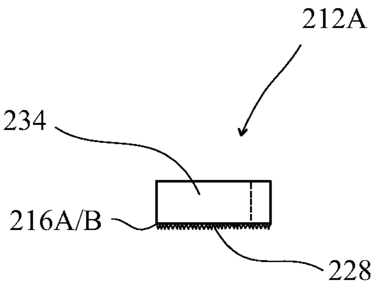

FIGS. 6A and 6B illustrate different views of the cradle member 212A. FIG. 6A depicts the cradle member 212A as seen from the right-hand side of FIG. 5. FIG. 6B depicts the top 234 of the cradle member 212A as seen from the top of the view of FIG. 6A. The view of FIG. 6A illustrates how the top arm 216A and the bottom arm 216B define the opening 218, and also illustrates the surface 228. From the view of FIG. 6A, it may be seen that in this embodiment the surface 228 includes the right-hand surfaces (from the view of FIG. 5) of the top arm 216A and the bottom arm 216B.

FIGS. 6A and 6B also illustrate that in some embodiments the surface 228 comprises a rough (e.g., knurled) surface for engaging the coupler C. For example, such a rough surface may tend to prevent the coupler C from sliding sideways off the surface 228 as the coupler C is being forced off the tubing T. It should be appreciated that other embodiments described herein also may include such a rough surface in some implementations even though the rough surface is not explicitly shown.

Figure 7B:
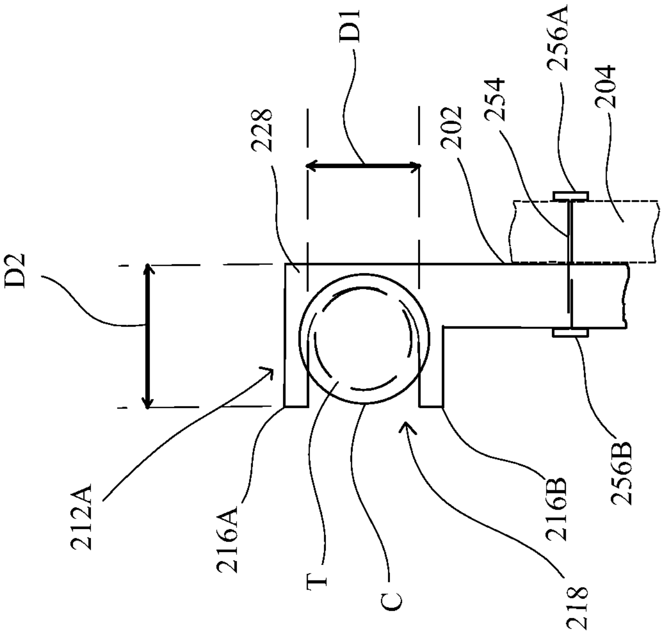
Figure 7A:
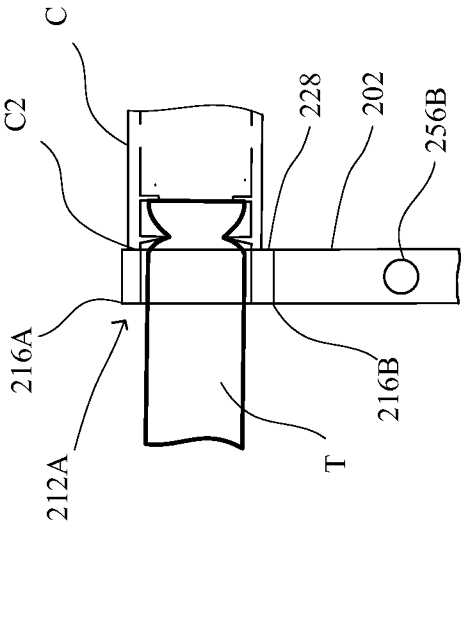

FIGS. 7A and 7B illustrate how the coupler C and the tubing T are positioned relative to the cradle member 212A prior to removal of the coupler C from the tubing T. As above, portions of the interior of the coupler C are shown here (i.e., not in phantom) for purposes of illustration.

FIG. 7A illustrates the left-most end C2 of the coupler C engaging the surface 228 of the cradle member 212A. FIG. 7A also illustrates that the right-most section of the tubing T lies within the left-hand side opening of the coupler C and that a section of the tubing T to the left of the left-most section within the coupler C passes through the opening 218.

FIG. 7B illustrates a view from the right-hand side of FIG. 7A. This view illustrates more clearly that the outer dimensions of the coupler C are larger than the opening 218. In this way, the coupler C is prevented from passing through the opening 218 when the coupler C is being removed from the tubing T. This view also shows that the outer circumference of the tubing T (shown in phantom) fits within the opening 218. To reduce the complexity and improve the clarity of FIG. 7B, the coupler C and the tubing T are depicted as simple circles.

In various embodiments, the opening 218 may be sized to fit different sizes of tubing T. As a specific example, to accommodate tubing T having an outside diameter of ¼ of an inch, the opening 218 may have a width (e.g., dimension D1 in FIG. 7B) of approximately 5/16 of an inch or more. As another specific example, to accommodate tubing T having an outside diameter of 7/10 of an inch, the opening 218 may have a width D1 of approximately ¾ of an inch or more. Accordingly, in various embodiments, the opening 218 may have a width D1 within a range of approximately 5/16 of an inch to approximately ¾ of an inch.

An upper limit for the size of the opening 218 depends on the size of the coupler C. For example, the width D1 is restricted in size to prevent the coupler from being pulled through the opening 218.

An outer linear dimension of the surface 228 (e.g., dimension D2 in FIG. 7B) may be sized to accommodate the different sized couplers that are used with different sized tubing. For example, in various embodiments, the surface 228 may have an outer linear dimension D2 within a range of approximately ½ of an inch to approximately 1 and ¼ inches.

FIG. 7B also illustrates an example of a pivot pin 254 that is employed to pivotably couple the elongated member 202 to the elongated member 204 (shown partially and in phantom in FIG. 7B). In this example, the portion of the pivot pin 254 that extends from the elongated member 202 will pass through a hole in the elongated member 204 upon assembly of the elongated members 202 and 204. Also, in this example, the pivot pin 254 includes an attachment mechanism 256A (e.g., a nut, a rivet, etc.) to keep the elongated member 204 from sliding off the pivot pin 254. The pivot pin 254 may be coupled to the elongated member 202 in various ways. In some cases, a portion of the pivot pin 254 will pass through a hole in the elongated member 202 upon assembly of the elongated members 202 and 204. In this case, the pivot pin 254 may include or be coupled to an attachment mechanism 256B (e.g., a nut, a rivet, etc.) as shown in FIG. 7B to keep the elongated member 202 from sliding off the pivot pin 254. In other cases, a pivot pin may be fixed to the elongated member 202. For example, the attachment mechanism 256B may fix the pivot pin 254 to the elongated member 202. As another example (not shown in FIG. 7B), a pivot pin may simply protrude from the elongated member 202. It should be appreciated that other forms of pivot pins and attachment techniques may be employed in various embodiments constructed in accordance with the teachings herein.

FIGS. 8A-11B illustrate various aspects of the clamp member 214A. The illustrated embodiment of the clamp member 214A may be applicable to any of the embodiments described herein. Thus, to avoid repetition, the other embodiments (e.g., FIGS. 13-42B) do not describe their respective clamp members in detail. Also, it should be appreciated that different apparatuses constructed in accordance with the teachings herein may employ different types of clamp members (e.g., which are not identical to the claim member 214A).

Figure 8B:
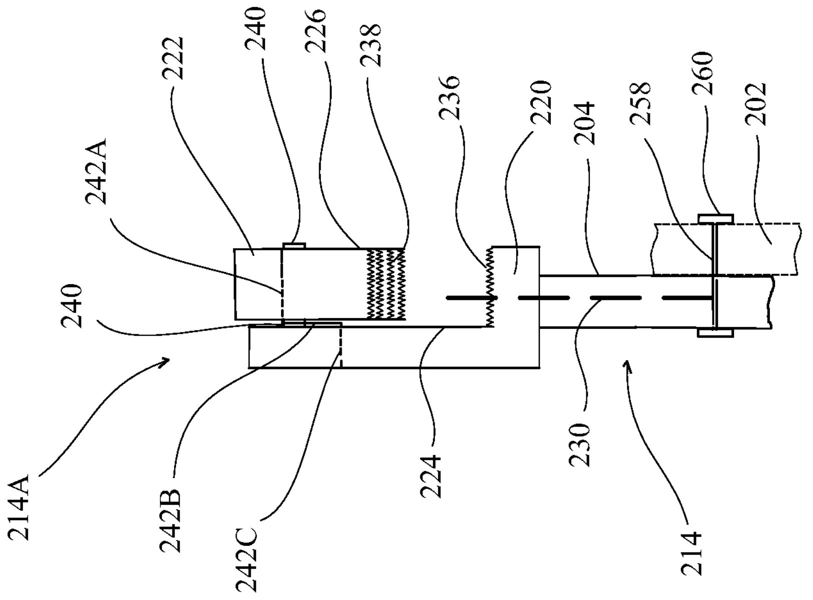
Figure 8A:
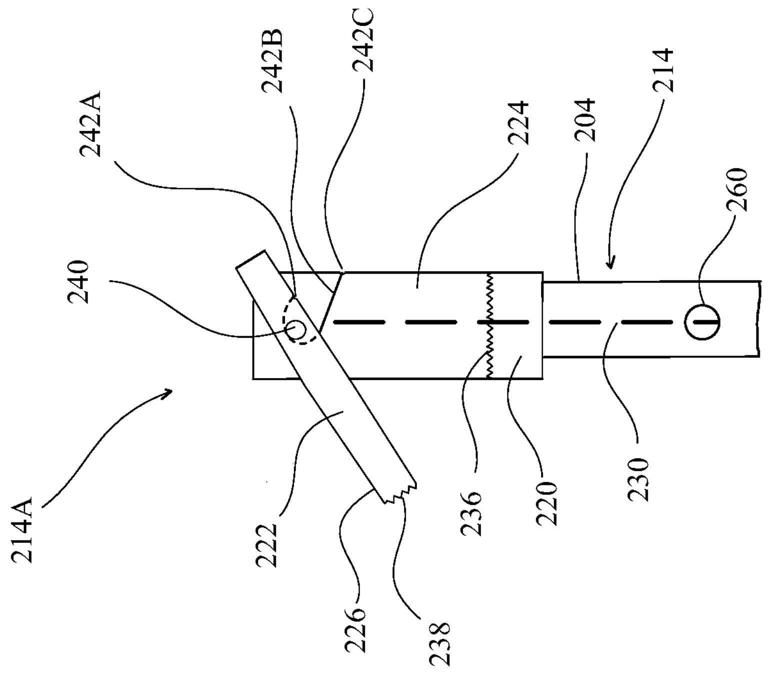

FIG. 8A illustrates the clamp member 214A from the view of FIG. 5. FIG. 8B illustrates the clamp member 214A from a view from the left-hand side of FIG. 8A. Here, it may be seen that the side wall 224 of the clamp member 214A is substantially (e.g., approximately or exactly) perpendicular to the lower wall 220 of the clamp member 214A. Further, these figures illustrate that the side wall 224 is substantially (e.g., approximately or exactly) parallel to the longitudinal axis 230 of the distal section 214.

FIGS. 8A and 8B illustrate that in some embodiments the lower wall 220 of the cradle member 212A comprises a rough upper surface 236 for more effectively engaging tubing. This rough surface may be implemented in various ways. In a typical implementation, the rough upper surface 236 comprises a knurled surface.

FIGS. 8A and 8B illustrate that in some embodiments the distal end 226 of the rotating member 222 comprises a rough distal end surface 238 for more effectively engaging tubing. This rough surface also may be implemented in various ways. For example, the rough distal end surface 238 may comprise a knurled surface.

FIGS. 8A and 8B also illustrate that in some embodiments the rotating member 222 and the side wall 224 are pivotally coupled at a pivot point 240. For example, a pivot pin located at pivot point 240, as illustrated, may be formed as part of or attached to (e.g., by welding, bolting, screwing, adhesive, or some other suitable mechanical attachment mechanism) the side wall 224. It should be appreciated that other types of pivot-based couplings located at pivot point 240 may be employed in other embodiments consistent with the teachings herein (e.g., as described above for FIG. 7B).

Finally, FIGS. 8A and 8B illustrate that in some embodiments a biasing member (represented by biasing member sections 242A, 242B, and 242C) is coupled between the rotating member 222 and the side wall 224. Such a biasing member may, for example, bias the distal end 226 of the rotating member 222 toward the upper surface 236 of the lower wall 220. In this way, by action of the biasing member, the distal end 226 of the rotating member 222 will tend to actively engage (e.g., press against) tubing that is placed on the upper surface 236, thereby holding the tubing firmly in place by the clamping member 214A.

In some embodiments, the biasing member comprises a spring (e.g., constructed of a strand of elastic metal or other suitable material). The different sections 242A, 242B, and 242C of the biasing member depicted in FIGS. 8A and 8B illustrate one way of biasing the rotating member 222 relative to the side wall 224 (and, in some apsects, to the upper surface 236 of the lower wall 220). Here, an upper section 242A of the biasing member is embedded within or otherwise connected to the rotating member 222 at a location that is above the pivot point 240. A middle section 242B of the biasing member extends from the upper section 242A of the biasing member and passes between the rotating member 222 and the side wall 224. A lower section 242C of the biasing member extends from the middle section 242B of the biasing member and is embedded within or otherwise connected to the side wall 224 at a location that is below the pivot point 240. In some embodiments, the lower section 242C lies within a notch as shown in FIG. 8A. By deploying the biasing member in such a manner that the biasing member (e.g., spring) is compressed when the rotating member 222 is in the position of FIG. 8A, the biasing member may bias the rotating member 222 to turn in a counter-clockwise direction (from the view of FIG. 8A) such that the distal end 226 of the rotating member 222 is biased toward the upper surface 236 of the lower wall 220.

FIG. 8B also illustrates an example of a pivot pin 258 (e.g., corresponding to the pivot pin 254 of FIG. 7B) that may be employed to pivotally couple the elongated member 204 to the elongated member 202 (shown partially and in phantom in FIG. 8B). In this example, the portion of the pivot pin 258 that extends from the elongated member 204 will pass through a hole in the elongated member 202 upon assembly of the elongated members 202 and 204. Also, in this example, the pivot pin 258 includes an attachment mechanism 260 (e.g., a nut, a rivet, etc.) to keep the elongated member 202 from sliding off the pivot pin 258.

Figure 9B:
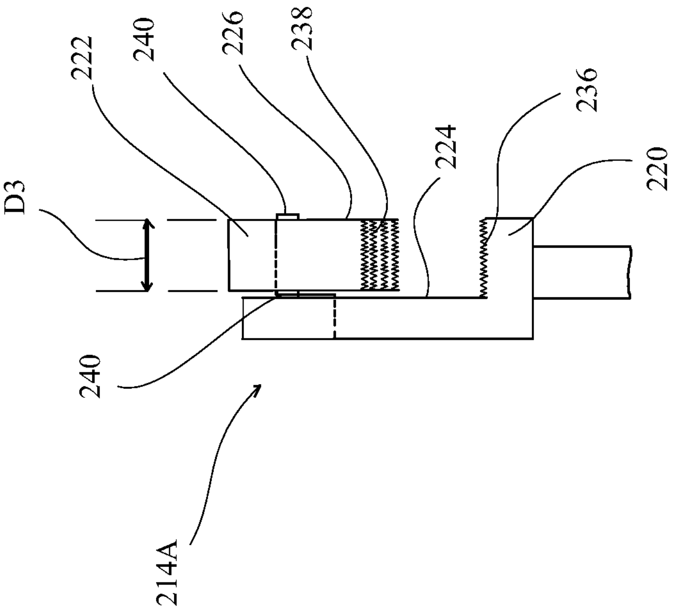
Figure 9A:
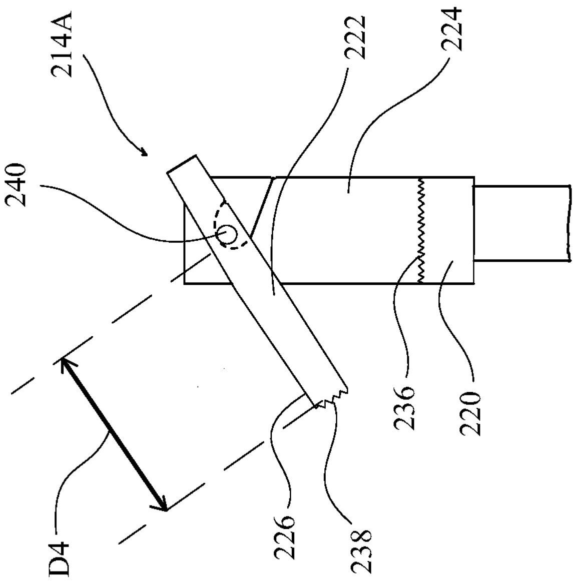

FIGS. 9A and 9B illustrate the rotating member 222 at a position where the distal end 226 is closer to the upper surface 236 of the lower wall 220 (e.g., due to the bias of the biasing member). FIG. 9B illustrates the clamp member 214A as viewed from the left-hand side of FIG. 9A. Here, it may be seen that the rough distal end surface 238 of the rotating member 222 and the rough upper surface 236 of the lower wall 220 are positioned to effectively grip tubing that is placed on the rough upper surface 236 of the lower wall 220.

Similar to the opening 218 of the cradle member 212A, parts of the clamp member 214A may be sized to fit different sizes of tubing and to accommodate flattening of the tubing (e.g., caused by the clamp member 214A). As a specific example, to accommodate tubing having an outside diameter of ¼ of an inch, the lower wall 220 and/or the rotating member 222 may have a width perpendicular to the side wall 224 (e.g., dimension D3 in FIG. 9B) of approximately $\frac{3}{16}$ of an inch or more. As another specific example, to accommodate tubing having an outside diameter of $\frac{7}{10}$ of an inch, the lower wall 220 and/or the rotating member 222 may have a width D3 perpendicular to the side wall 224 of approximately 1 and ¼ of an inch or more. Accordingly, in various embodiments, the lower wall 220 and/or the rotating member 222 may have a width D3 perpendicular to the side wall 224 within a range of approximately $\frac{3}{16}$ of an inch to approximately 1 and ¼ of an inch.

The length of the rotating member 222 also may be sized to fit different sizes of tubing. For example, in various embodiments, the distance from the pivot point 240 to the distal end surface 238 of the rotating member 222 (e.g., dimension D4 in FIG. 9A) may be within a range of approximately ½ of an inch to approximately 2 inches.

Figure 10B:
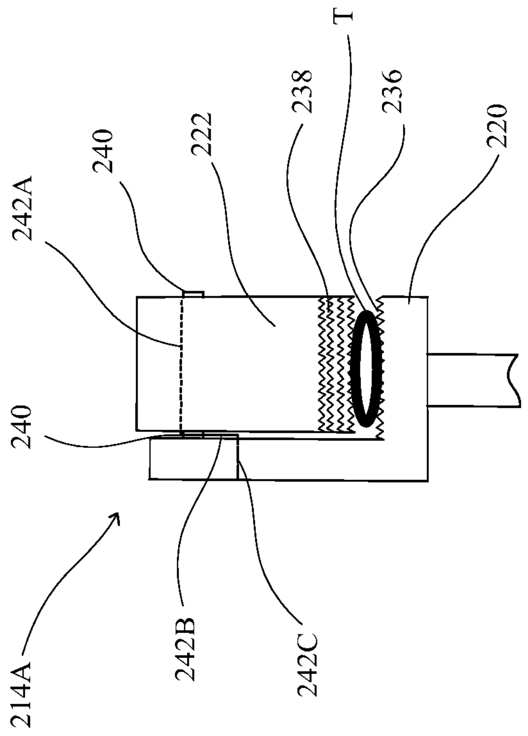
Figure 10A:
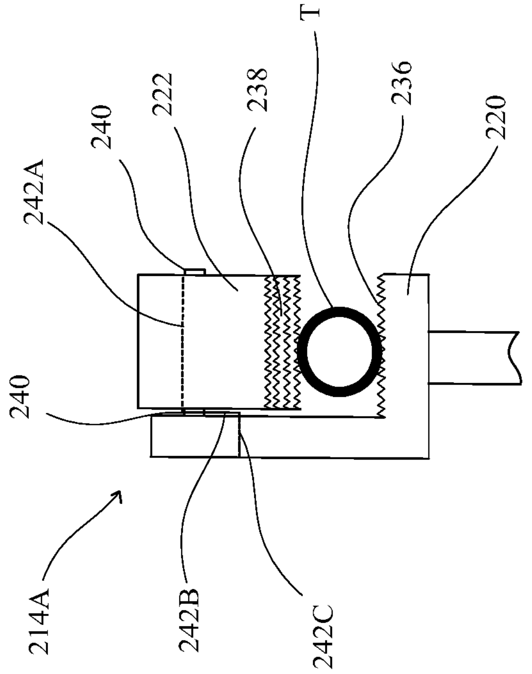

FIGS. 10A and 10B illustrate how the distal end surface 238 of the rotating member 222 and the upper surface 236 of the lower wall 220 may cooperate to engage tubing T. FIG. 10A illustrates a scenario where the rotation of the rotating member 222 (e.g., by action of the biasing member) has caused the distal end surface 238 to initially make contact with the tubing T. FIG. 10B illustrates a scenario where the biasing force is sufficiently strong to cause the rotating member 222 to significantly flatten the tubing T. In this way, a very firm grip on the tubing T may be achieved.

Figure 11A:
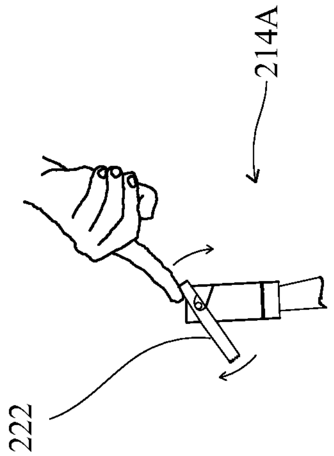

FIG. 11A illustrates that in a typical use scenario, a user of the apparatus 200 may pull back the rotating member 222 (e.g., using his or her finger or thumb) when tubing is being placed into the clamp member 214A. In this case, the rotating member 222 is rotated in a clockwise direction (as indicated by the arrows).

Figure 11B:
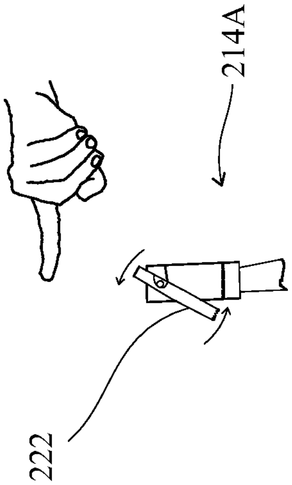

FIG. 11B illustrates that once the tubing is in place (not shown), a user of the apparatus 200 may release the rotating member 222 (or push the rotating member 222 using his or her finger or thumb) so that the rotating member 222 actively engages the tubing. In this case, the rotating member 222 is rotated in a counter-clockwise direction (as indicated by the arrows).

Figure 12A:
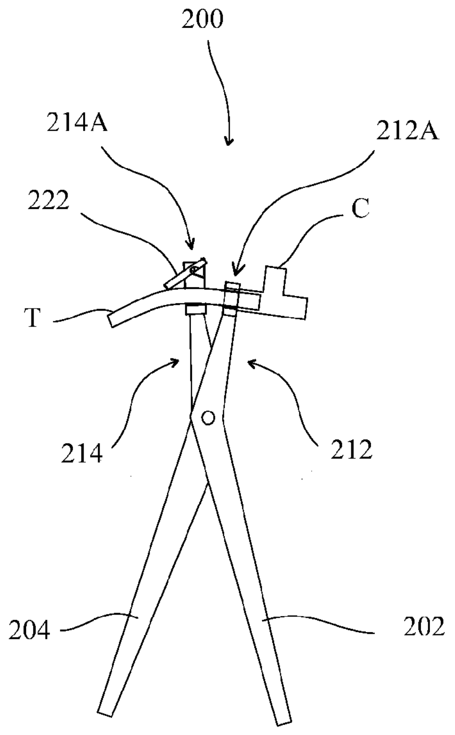
Figure 12B:
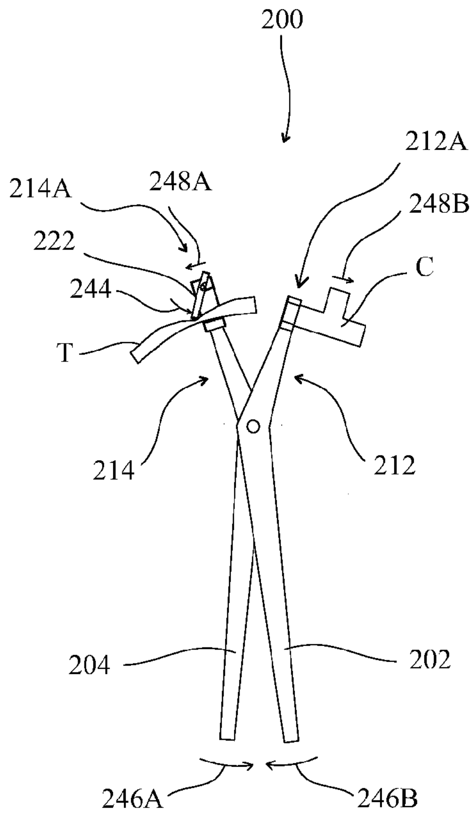

FIGS. 12A and 12B illustrate the two-step process of removing the coupler C from the tubing T. In FIG. 12A, the coupler C and the tubing T (coupled together) are positioned within the cradle member 212A of the elongated member 202 and the clamp member 214A of the elongated member 204, respectively. In FIG. 12B, the rotating member 222 has been rotated counter-clockwise (as indicated by the arrow 244) and has engaged the tubing T. In addition, the handles of the elongated member 202 and the elongated member 204 have been compressed together (as indicated by the arrows 246A and 246B). This action thus results in the cradle member 212A and the clamp member 214A being further separated from one another (as indicated by the arrows 248A and 248B), thereby removing the coupler C from the tubing T.

FIGS. 13-19B illustrate another embodiment of an apparatus 1300 for removing a coupler from tubing in accordance with the teachings herein. In this embodiment, the entire cradle member of the apparatus 1300 is angled slightly as compared to the cradle member of the apparatus 200. In some aspects, this angle serves to prevent the coupler from sliding off the cradle member as the handles are closed (compressed) together.

Other aspects of the apparatus 1300 are similar to corresponding aspects of the apparatus 200 of FIGS. 2-12B. Accordingly, the features described by the reference numbers (e.g., 2xx) for the apparatus 200 may correspond to similar reference numbers (e.g., 13xx) for the apparatus 1300. To avoid unnecessary repetition, some of these similar reference numbers will not be discussed in the description of FIGS. 13-19B.

Similar to the apparatus 200, the apparatus 1300 includes elongated members 1302 and 1304 pivotally coupled along a pivot point 1306. The elongated member 1302 comprises a distal section 1312 comprising a cradle member 1312A, while the elongated member 1304 comprises a distal section 1314 comprising a clamp member 1314A.

Figure 13:
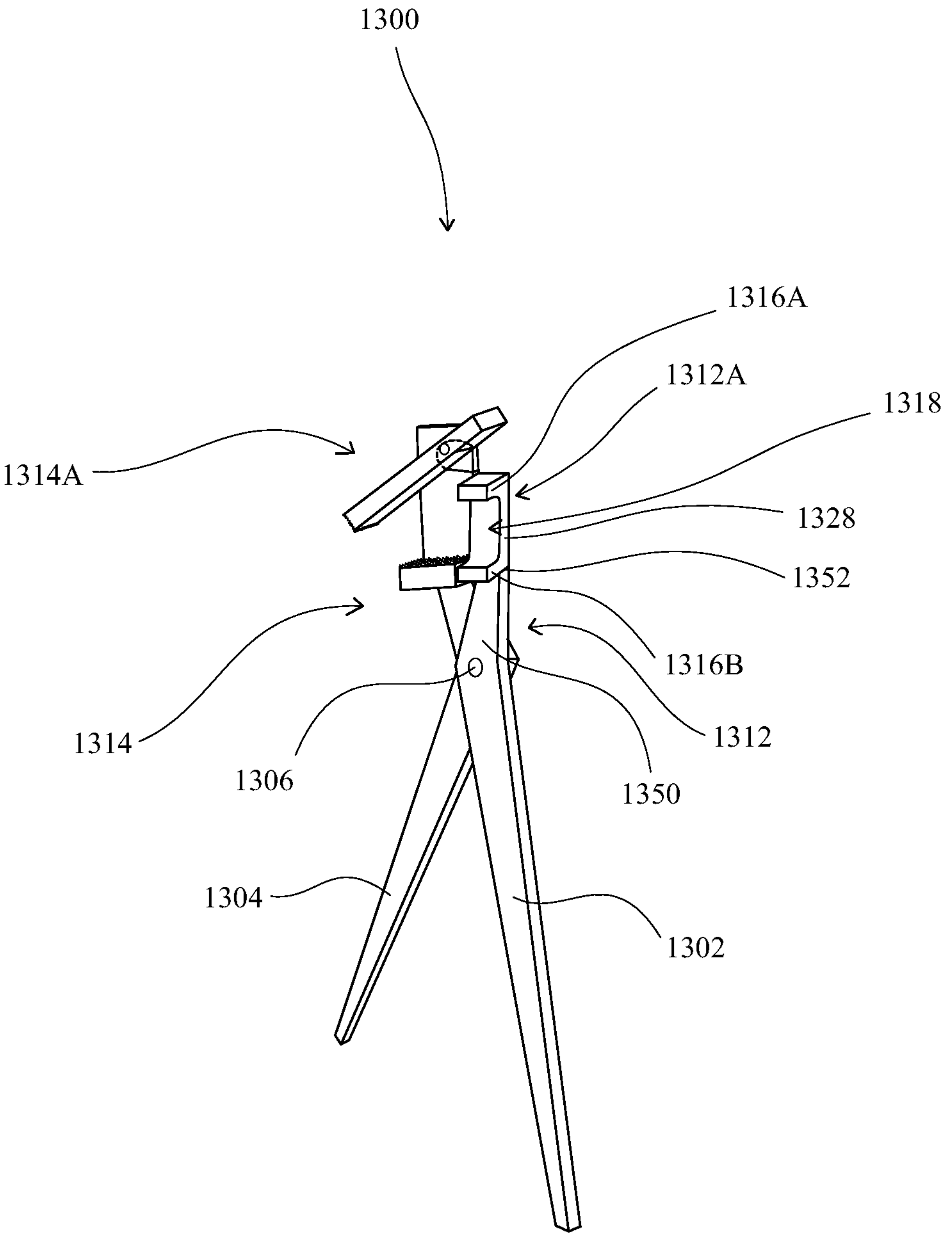
FIGS. 13-19B are simplified diagrams illustrating another embodiment of an apparatus for removing a coupler from tubing, wherein the apparatus comprises an angled cradle member component.

In FIG. 13, however, the entire cradle member 1312A is angled slightly relative to an arm 1350 of the distal section 1312 of the elongated member 1302. Specifically, the right-hand surface 1328 (comprised in part of the right hand surfaces of the arms 1316A and 1316B) of the cradle member 1312A is angled toward the right of the page relative to the right-hand surface (from this view) of the arm 1350 along a mating joint (juncture) 1352. Thus, in this embodiment, the surface 1328 of the cradle member 1312A will not be aligned parallel to a plane passing through the axis of a pivot pin located at the pivot point 1306.

Figure 14:
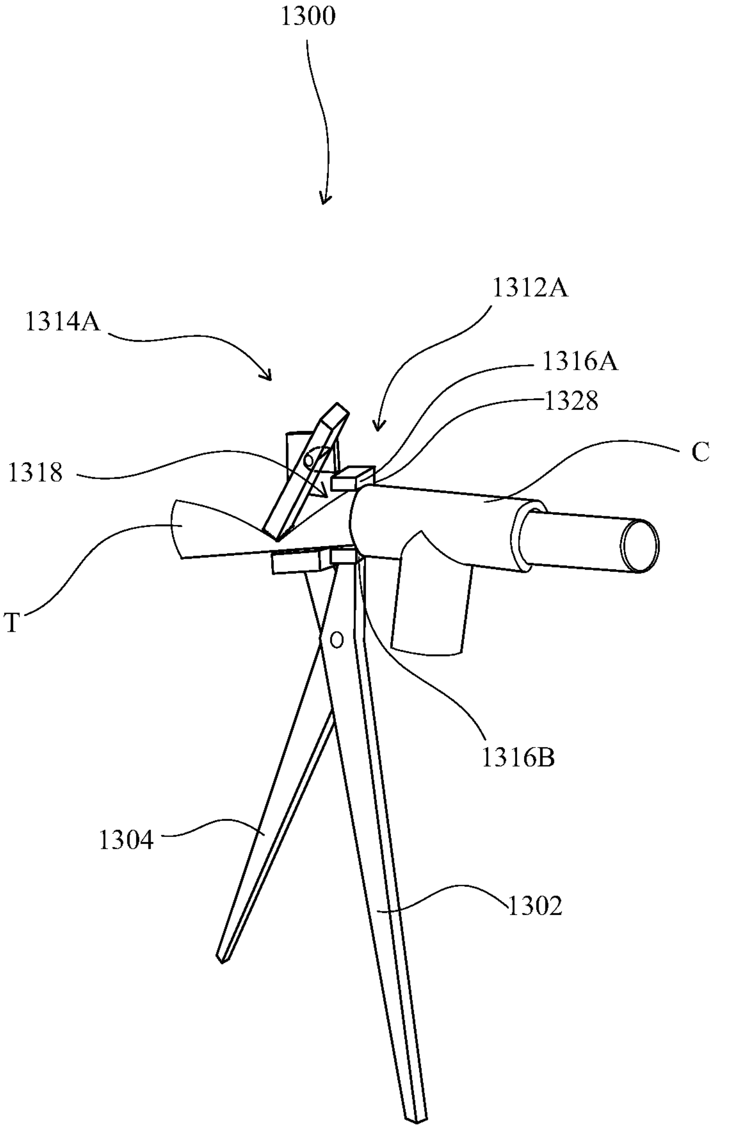
Figure 15:
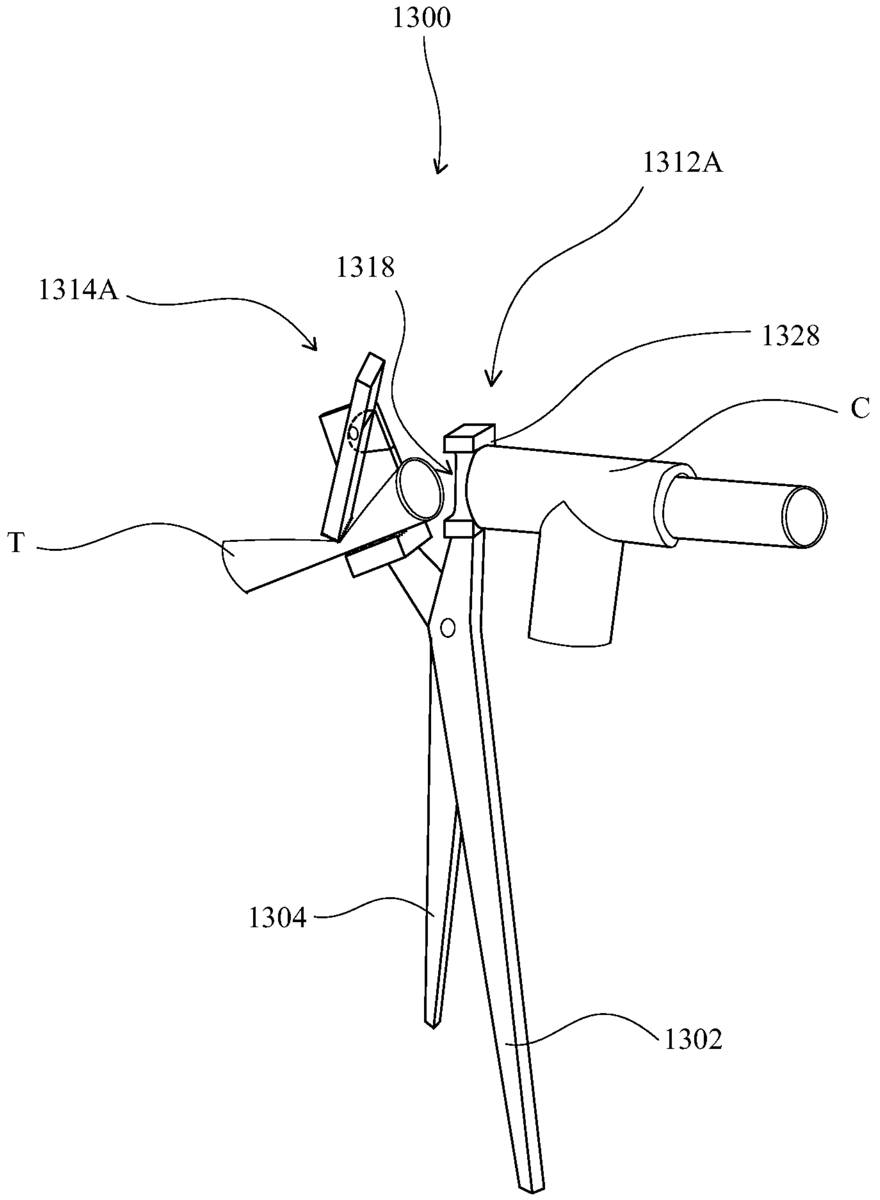

FIGS. 14 and 15 illustrate that when the coupler C engages the surface 1328, the coupler C will be rotated slightly (e.g., the right end of the coupler C will be further into the page) as compared to the orientation of the coupler C in FIGS. 3 and 4 for the apparatus 200. As shown in FIG. 14, this slight angling of the coupler C will more effectively hold the coupler C against the surface 1328 and tend to prevent the tubing T and coupler C from sliding out of the opening 1318 of the cradle member 1312A (e.g., during the act of removing the coupler C from the tubing T). FIG. 15 shows the coupler C after it has been removed from the tubing T.

Figure 16:
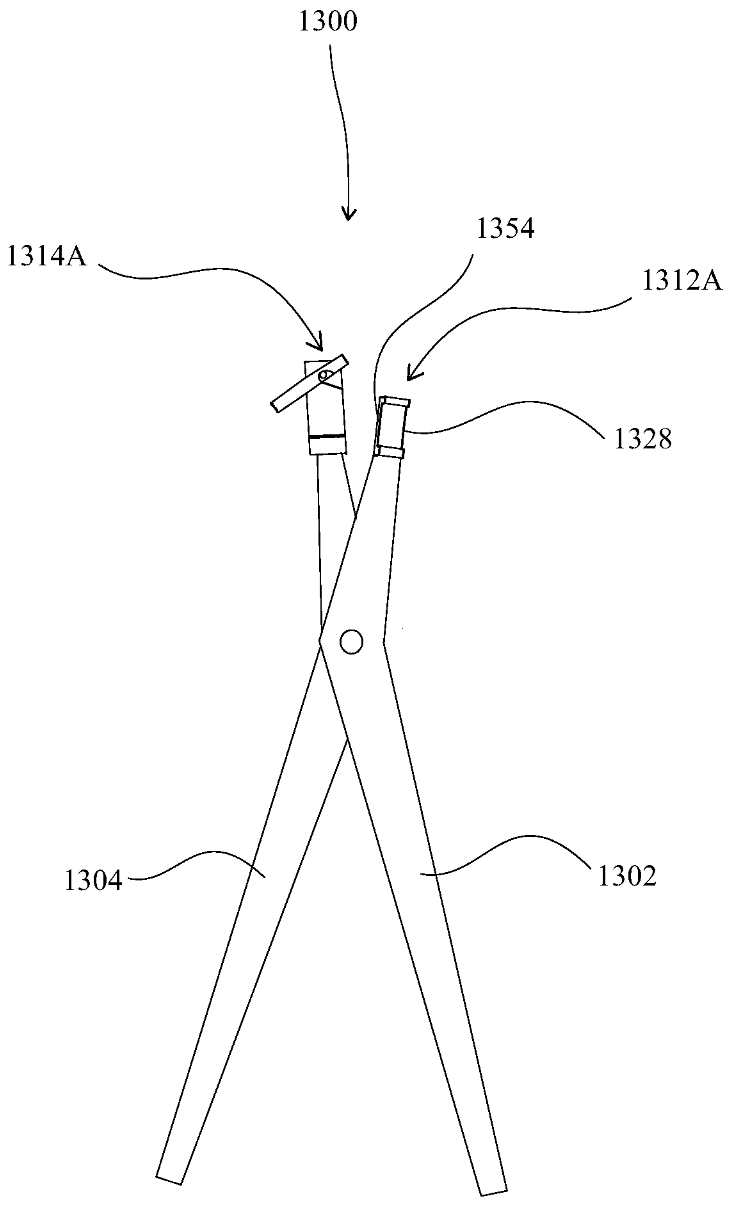

FIG. 16 illustrates the slight angle of the entire cradle member 1312A from a different angle. Here, it may be seen that the left-hand side 1354 (from this view) of the cradle member 1312A is not perpendicular to the page. Similarly, the right-hand side 1328 (not visible in FIG. 16) of the cradle member 1312A is not perpendicular to the page. This is in contrast to the orientation of the corresponding sides of the cradle member 212A of the apparatus 200 as depicted in FIG. 5.

Figure 17A:
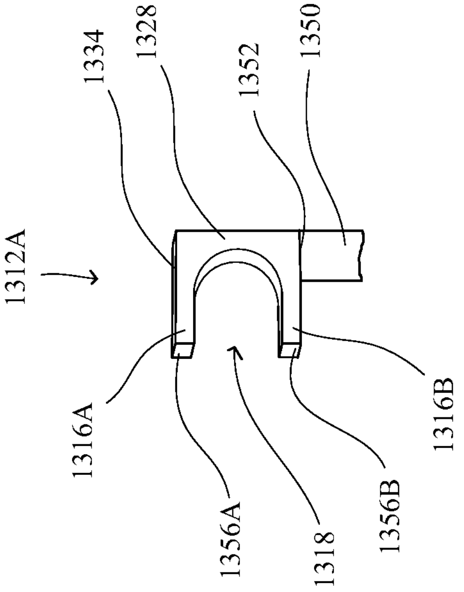
Figure 17B:
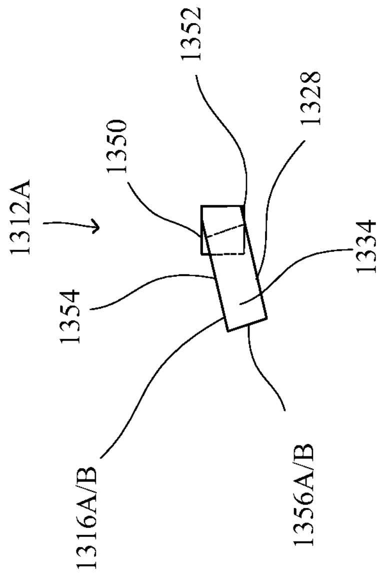

FIGS. 17A and 17B further illustrate the slight angle of the entire cradle member 1312A.

FIG. 17A depicts the cradle member 1312A as seen from the right-hand side of FIG. 16. Here, it may be seen that front ends 1356A and 1356B (from this view) of the arms 1316A and 1316B, respectively, of the cradle member 1312A are not substantially (e.g., approximately or exactly) perpendicular to the page. Instead, the front ends 1356A and 1356B are rotated counter-clockwise relative to the arm 1350 of the elongated member 1302. This is in contrast to the orientation of corresponding front ends of the arms 216A and 216B of the cradle member 212A of the apparatus 200 as depicted in FIG. 6A.

FIG. 17B depicts the top 1334 of the cradle member 1312A as seen from the top of the view of FIG. 17A. Here, it may be seen that the top arm 1316A and the bottom arm 1316B, comprising in part the surfaces 1328 and 1354 of the cradle member 1312A (e.g., that define the opening 1318 as depicted in FIG. 17A) are rotated relative to the arm 1350 of the elongated member 1302, along mating joint (juncture) 1352.

Figure 18A:
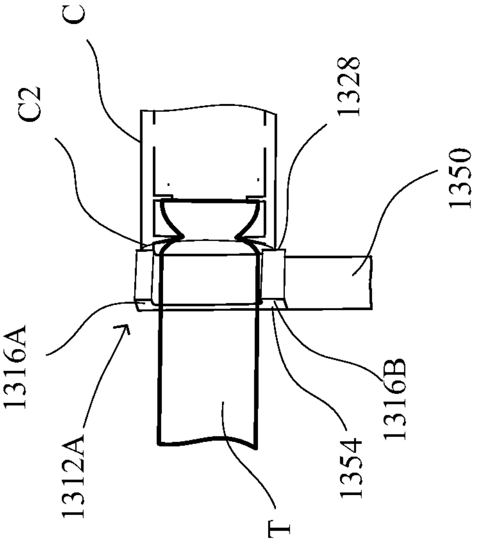
Figure 18B:
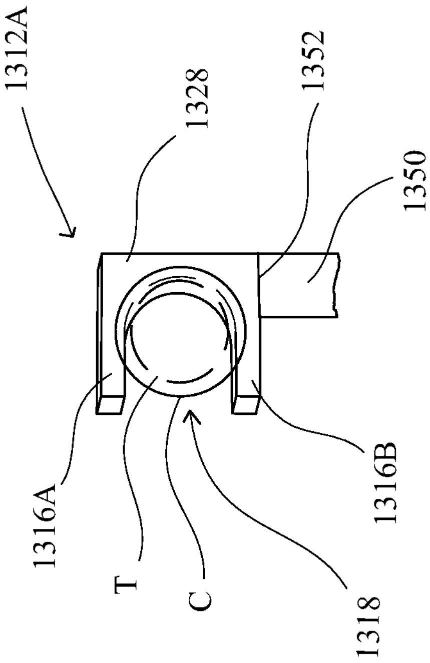

FIGS. 18A and 18B illustrate how the coupler C and the tubing T are positioned relative to the cradle member 1312A prior to removal of the coupler C from the tubing T. To facilitate a better understanding of the structure of these components, some hidden lines are depicted as solid lines in these figures.

FIG. 18A illustrates the left-most end C2 of the coupler C engaging the surface 1328 of the cradle member 1312A. Here, in contrast with FIG. 7A, it may be seen that the plane that defines the end C2 is not substantially (e.g., approximately or exactly) perpendicular to the page in the embodiment of FIG. 18A because the top arm 1316A and the bottom arm 1316B of the cradle member 1312A are rotated relative to the arm 1350 of the elongated member 1302.

FIG. 18B illustrates the cradle member 1312A as viewed from the right-hand side of FIG. 18A. To reduce the complexity of FIG. 18B, the coupler C and the tubing T are shown in a simplified two-dimensional manner. Here, it may be seen that the top arm 1316A and the bottom arm 1316B of the cradle member 1312A are rotated relative to the arm 1350, along the mating joint (juncture) 1352, thereby causing the coupler C to be rotated slightly relative to the page in contrast with the depiction of the apparatus 200 in FIG. 7B. Similar to FIG. 7B, to reduce the complexity and improve the clarity of FIG. 18B, the coupler C and the tubing T are depicted as simple circles.

Figure 19A:
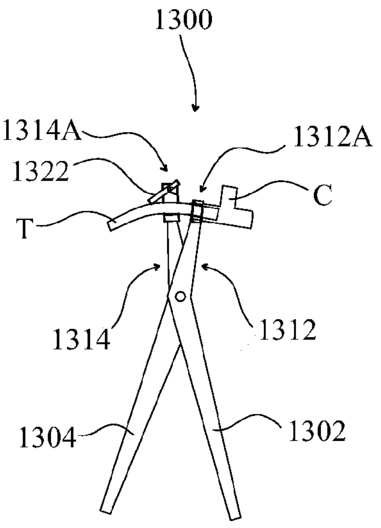
Figure 19B:
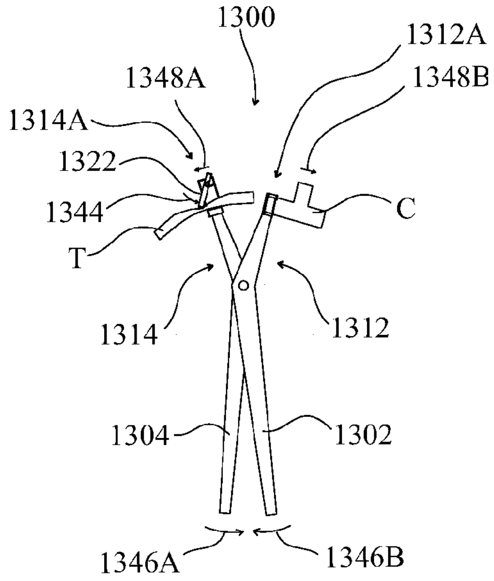

FIGS. 19A and 19B illustrate the two-step process of removing the coupler C from the tubing T through the use of the apparatus 1300. In FIG. 19A, the coupler C and the tubing T (coupled together) are positioned within the cradle member 1312A of the elongated member 1302 and the clamp member 1314A of the elongated member 1304, respectively. In this case, the coupler C is rotated slightly relative to the comparable illustrations in FIGS. 12A and 12B for the apparatus 200. In FIG. 19B, the rotating member 1322 has been rotated counter-clockwise (as indicated by the arrow 1344) and has engaged the tubing T. In addition, the handles of the elongated member 1302 and the elongated member 1304 have been compressed together (as indicated by the arrows 1346A and 1346B). This action thus results in the cradle member 1312A and the clamp member 1314A being further separated from one another (as indicated by the arrows 1348A and 1348B). The slight rotation of the coupler C (e.g., as shown more clearly in FIGS. 17B and 18A) tends to prevent the coupler C and the tubing T from sliding out of the opening 1318 (during the operation shown in FIG. 19A) until the removal of the coupler C from the tubing T is complete (as shown in FIG. 19B).

FIGS. 20-23B illustrate another embodiment of an apparatus 2000 for removing a coupler from tubing in accordance with the teachings herein. In this embodiment, a portion of the cradle member is angled slightly as compared to the cradle member of the apparatus 200. Similar to the apparatus 1300, this angle serves to prevent the coupler from sliding off the cradle member as the handles are compressed together.

Other aspects of the apparatus 2000 are similar to corresponding aspects of the apparatus 200 of FIGS. 2-12B. Accordingly, the features described by the reference numbers (e.g., 2xx) for the apparatus 200 may correspond to similar reference numbers (e.g., 20xx) for the apparatus 2000. To avoid unnecessary repetition, some of these similar reference numbers are not discussed in the description of FIGS. 20-23B.

Similar to the apparatus 200, the apparatus 2000 includes elongated members 2002 and 2004 pivotally coupled along a pivot point 2006. The elongated member 2002 comprises a distal section 2012 comprising a cradle member 2012A, while the elongated member 2004 comprises a distal section 2014 comprising a clamp member 2014A.

Figure 20:
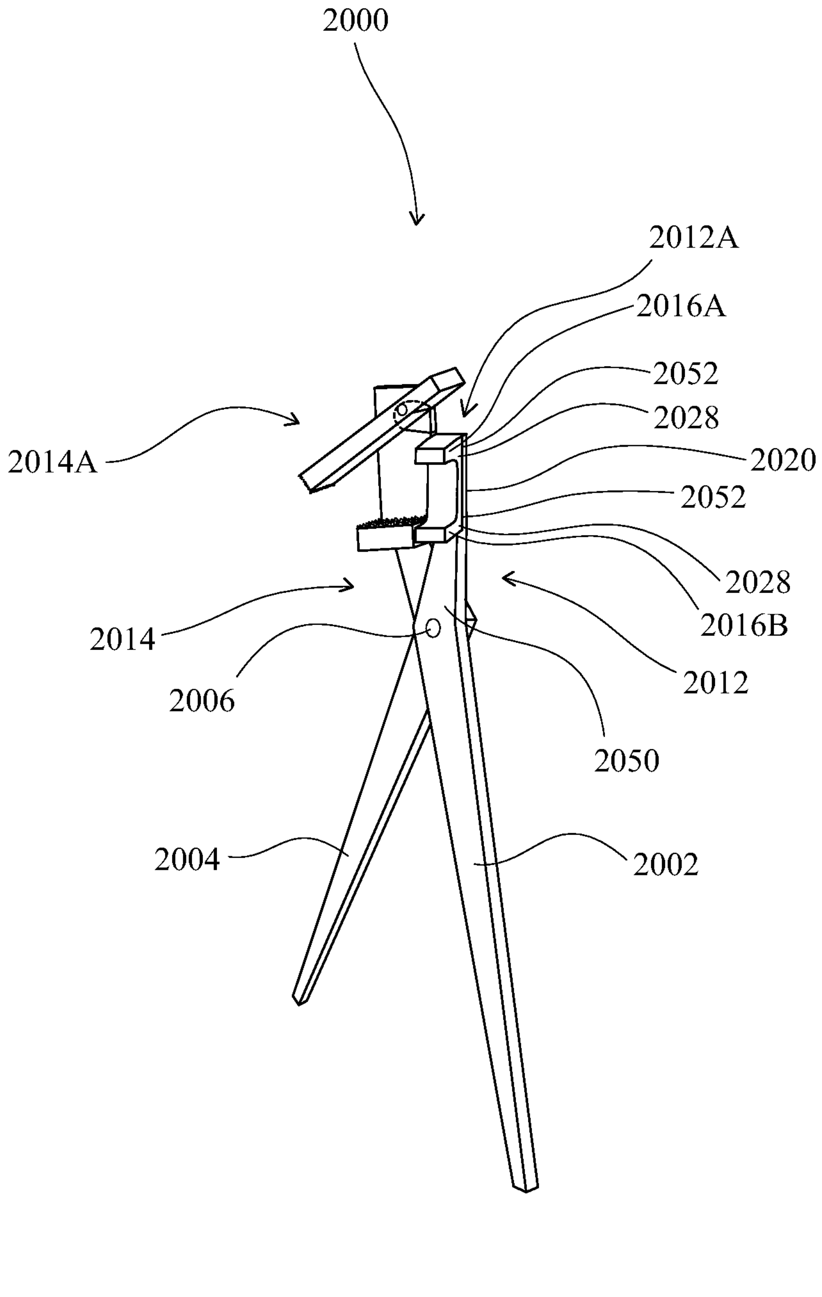
FIGS. 20-23B are simplified diagrams illustrating another embodiment of an apparatus for removing a coupler from tubing, wherein the apparatus comprises a partially-angled cradle member component.

In FIG. 20, however, a substantial portion of the cradle member 2012A has a slight angle. Specifically, a top arm 2016A, a bottom arm 2016B, and the front, upper (from this view) portion 2020 of an arm 2050 of the distal section 2012 of the elongated member 2002 are collectively angled relative to the rear, lower (from this view) remaining portion of the arm 2050, along a circumscribed mating joint (juncture) 2052 (e.g., tracing around the tubing hole 2018, see FIGS. 22A/B and 23A/B). Thus, in this embodiment, the surface 2028, comprised of the right surface (from this view) of the top arm 2016A, the bottom arm 2016B, and the front upper (from this view) portion of the arm 2050, forming the portion of the cradle member 2012A that has been angled relative to the rear lower (from this view) remaining portion of the arm 2050, will not be aligned parallel to a plane passing through a pivot pin located at the pivot point 2006.

Figure 21:
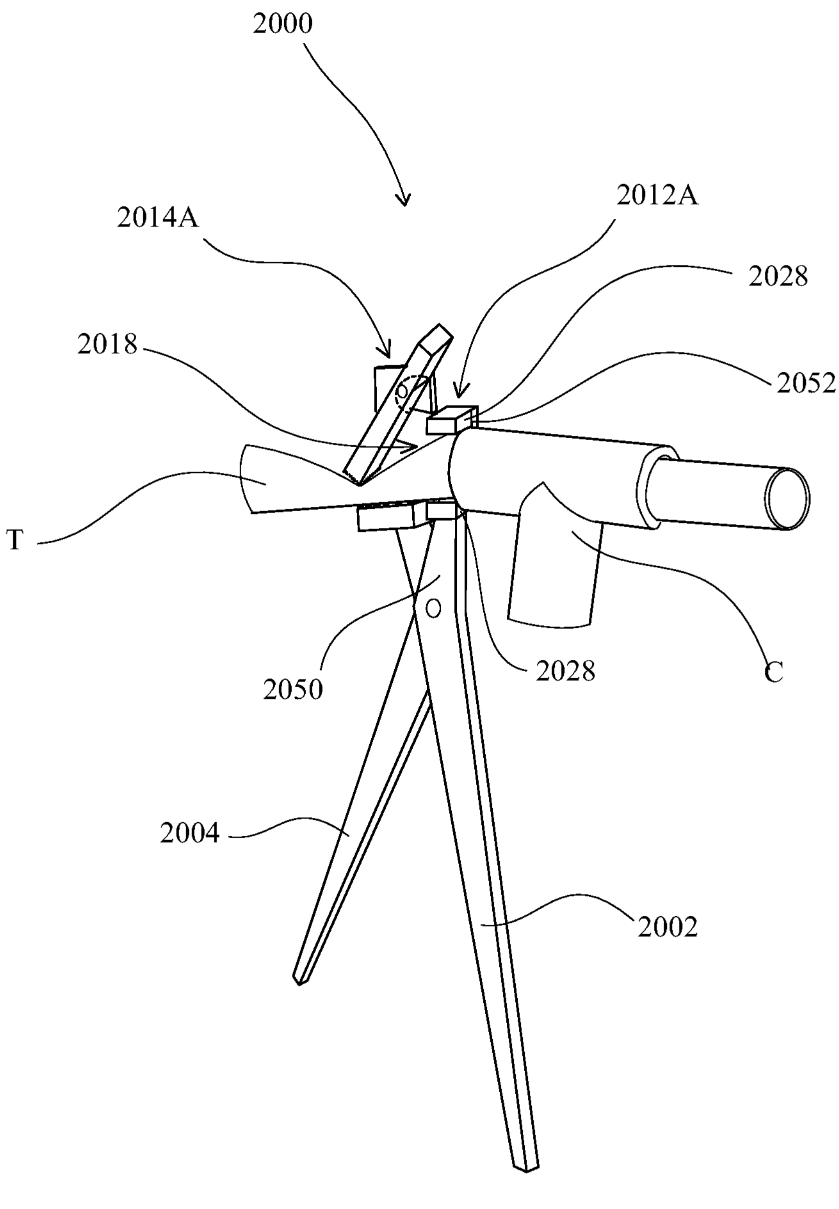

Consequently, as illustrated in FIG. 21, when the coupler C engages the surface 2028, the coupler C will be rotated slightly (e.g., the right end of the coupler C will be further into the page) as compared to the orientation of the coupler C in FIG. 2 for the apparatus 200. This slight angling of the coupler C will more effectively hold the coupler C against the surface 2028 and tend to prevent the tubing T and coupler C from sliding out of the opening 2018 of the cradle member 2012A.

Figure 22A:
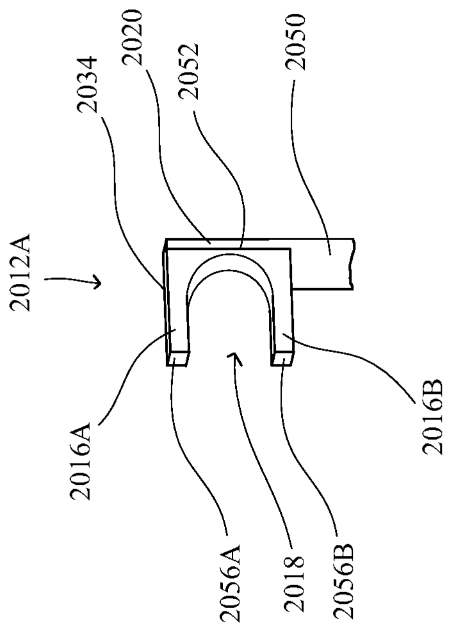
Figure 22B:
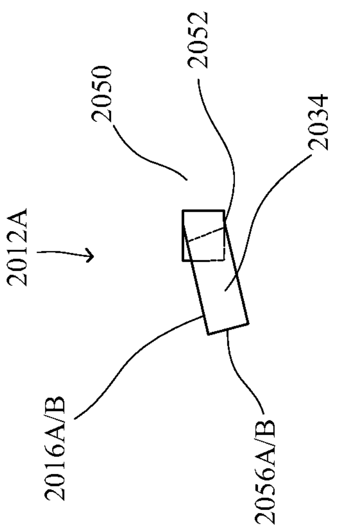

FIGS. 22A and 22B further illustrate the slight angle of the portion of the cradle member 2012A comprised of the arms 2016A and 2016B, and the front upper (from this view) portion of arm 2050.

FIG. 22A depicts the cradle member 2012A as seen from the right-hand side of FIG. 20. Here, it may be seen that the left-hand ends 2056A and 2056B (from this view) of the arms 2016A and 2016B, respectively, are not substantially (e.g., approximately or exactly) perpendicular to the page. This is in contrast to the orientation of the arms 216A and 216B of the cradle member 212A of the apparatus 200 as depicted in FIG. 6A.

FIG. 22B depicts the top 2034 of the cradle member 2012A as seen from the top of the view of FIG. 22A. Here, it may be seen that the top arm 2016A, the bottom arm 2016B, and the front upper portion of the arm 2050 that comprise a substantial portion of the cradle member 2012A (e.g., that define the opening 2018) are angled relative to the rear lower remaining portion of the arm 2050.

Figure 23B:
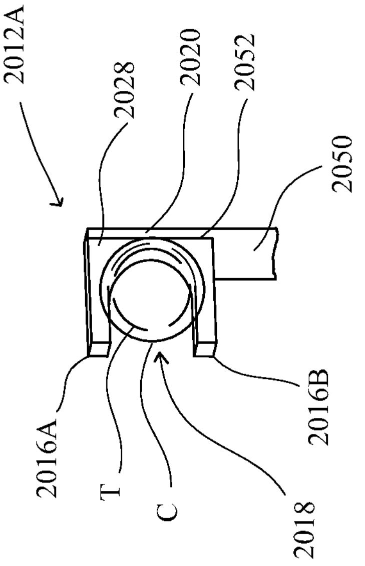
Figure 23A:
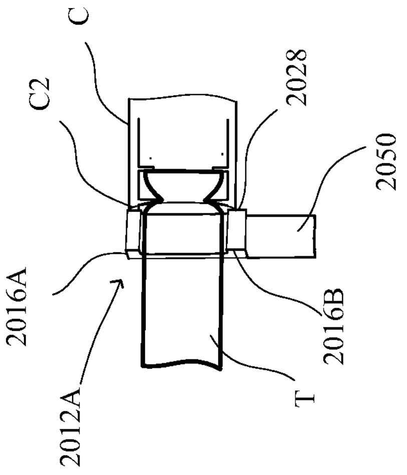

FIGS. 23A and 23B illustrate how the coupler C and the tubing T are positioned relative to the cradle member 2012A prior to removal of the coupler C from the tubing T.

FIG. 23A illustrates the left-most end C2 of the coupler C engaging the surface 2028 of the cradle member 2012A. Here, in contrast with the apparatus 200 of FIG. 7A, it may be seen that the plane that defines the end C2 is not substantially (e.g., approximately or exactly) perpendicular to the page in the embodiment (apparatus 2000) of FIG. 23A because the top arm 2016A, the bottom arm 2016B, and the front upper (from this view) portion of arm 2050 that form a substantial portion of the cradle member 2012A are angled relative to the rear lower (from this view) remaining portion of the arm 2050 of the elongated member 2002, along mating joint (juncture) 2052 (See FIG. 23B).

FIG. 23B illustrates the cradle member 2012A as viewed from the right-hand side of the view of FIG. 23A. Here, it may be seen that the top arm 2016A, the bottom arm 2016B, and the front upper (from this view) portion of the arm 2050 that form a substantial portion of the cradle member 2012A are angled relative to the rear lower (from this view) remaining portion of the arm 2050, thereby causing the coupler C to be rotated slightly relative to the page in contrast with the depiction of the apparatus 200 in FIG. 7B. Similar to FIG. 7B, to reduce the complexity and improve the clarity of FIG. 23B, the coupler C and the tubing T are depicted as simple circles.

FIGS. 24-27B illustrate another embodiment of an apparatus 2200 for removing a coupler from tubing in accordance with the teachings herein. In this embodiment, only portions of the cradle member are angled slightly as compared to the cradle member of the apparatus 200. Similar to the apparatus 1300, this angle serves to prevent the coupler from sliding off the cradle member as the handles are compressed together.

Other aspects of the apparatus 2200 are similar to corresponding aspects of the apparatus 200 of FIGS. 2-12B. Accordingly, the features described by the reference numbers (e.g., 2xx) for the apparatus 200 may correspond to similar reference numbers (e.g., 22xx) for the apparatus 2200. To avoid unnecessary repetition, some of these similar reference numbers are not discussed in the description of FIGS. 24-27B.

Similar to the apparatus 200, the apparatus 2200 includes elongated members 2202 and 2204 pivotally coupled along a pivot point 2206. The elongated member 2202 comprises a distal section 2212 comprising a cradle member 2212A, while the elongated member 2204 comprises a distal section 2214 comprising a clamp member 2214A.

Figure 24:
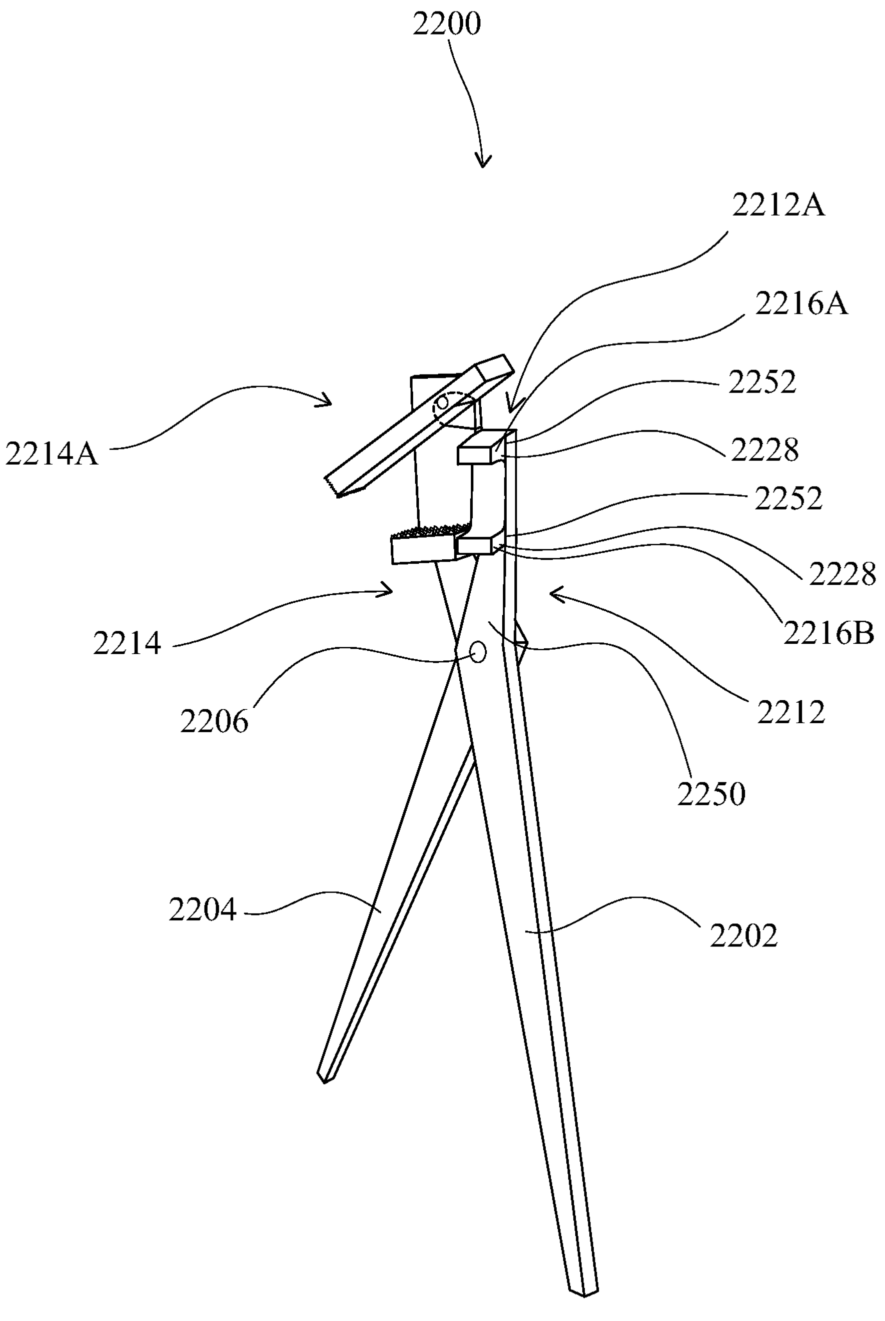
FIGS. 24-27B are simplified diagrams illustrating another embodiment of an apparatus for removing a coupler from tubing, wherein the apparatus comprises angled arms of the cradle member component.

In FIG. 24, however, portions of the cradle member 2212A have a slight angle. Specifically, a top arm 2216A and a bottom arm 2216B of the cradle member 2212A are angled relative to an arm 2250 of the distal section 2212 of the elongated member 2202, along mating joints (junctures) 2252. Thus, in this embodiment, the surface 2228, including the right surface (from this view) of the top arm 2216A and the bottom arm 2216B of the cradle member 2212A, will not be aligned substantially (e.g., approximately or exactly) parallel to a plane passing through a pivot pin located at the pivot point 2206.

Figure 25:
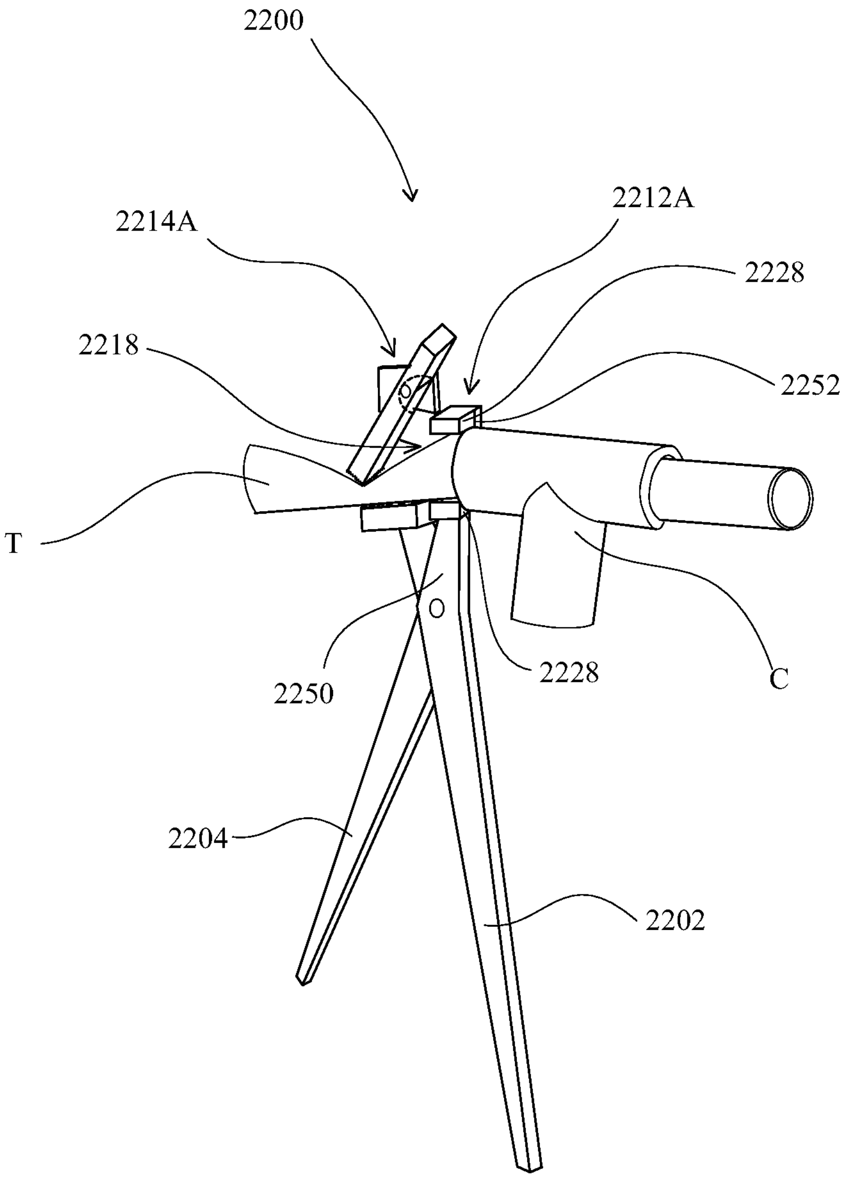

Consequently, as illustrated in FIG. 25, when the coupler C engages the surface 2228, the coupler C will be rotated slightly (e.g., the right end of the coupler C will be further into the page) as compared to the orientation of the coupler C in FIG. 2 for the apparatus 200. This slight angling of the coupler C will more effectively hold the coupler C against the surface 2228 and tend to prevent the tubing T and coupler C from sliding out of the opening 2218 of the cradle member 2212A.

Figure 26A:
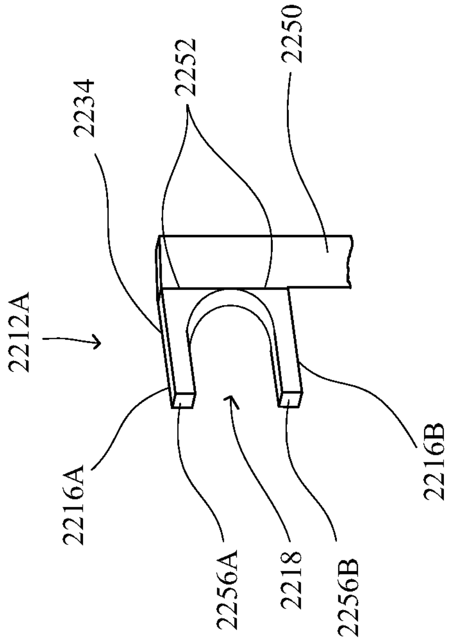
Figure 26B:
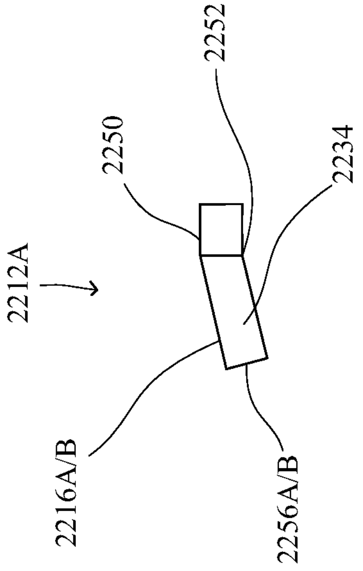

FIGS. 26A and 26B further illustrate the slight angle of the arms 2216A and 2216B of the cradle member 2212A.

FIG. 26A depicts the cradle member 2212A as seen from the right-hand side of FIG. 24. Here, it may be seen that left-hand ends 2256A and 2256B (from this view) of the arms 2216A and 2216B, respectively, are not substantially (e.g., approximately or exactly) perpendicular to the page. This is in contrast to the orientation of the arms 216A and 216B of the cradle member 212A of the apparatus 200 as depicted in FIG. 6A.

FIG. 26B depicts the top 2234 of the cradle member 2212A as seen from the top of the view of FIG. 26A. Here, it may be seen that the top arm 2216A and the bottom arm 2216B of the cradle member 2212A (e.g., that define the opening 2218) are angled relative to the arm 2250 of the elongated member 2202.

Figure 27B:
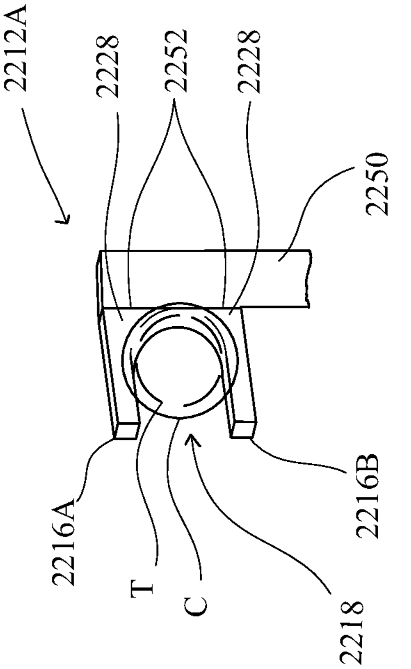
Figure 27A:
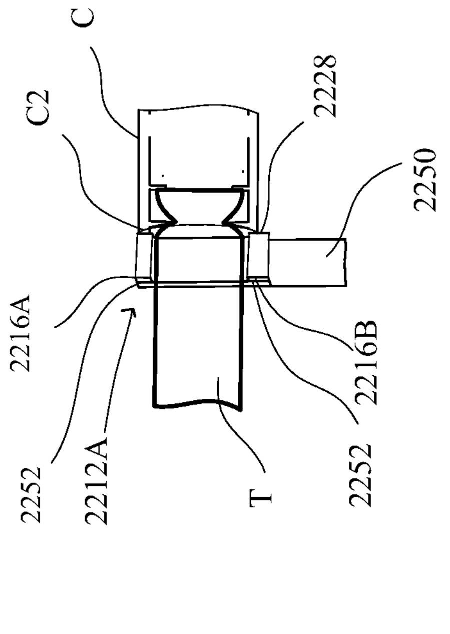

FIGS. 27A and 27B illustrate how the coupler C and the tubing T are positioned relative to the cradle member 2212A prior to removal of the coupler C from the tubing T. To facilitate a better understanding of the structure of these components, some hidden lines are depicted as solid lines in these figures.

FIG. 27A illustrates the left-most end C2 of the coupler C engaging the surface 2228 of the cradle member 2212A. Here, in contrast with the apparatus 200 of FIG. 7A, it may be seen that the plane that defines the end C2 is not substantially (e.g., approximately or exactly) perpendicular to the page in the embodiment (apparatus 2200) of FIG. 27A because the top arm 2216A and the bottom arm 2216B of the cradle member 2212A are angled relative to the arm 2250 of the elongated member 2202, along mating joints (junctures) 2252.

FIG. 27B illustrates cradle member 2212A from the right-hand side of the view of FIG. 27A. To reduce the complexity of FIG. 27B, the coupler C and the tubing T are shown in a simplified two-dimensional manner. FIG. 27B illustrates that the top arm 2216A and the bottom arm 2216B of the cradle member 2212A are angled relative to the arm 2250, thereby causing the coupler C to be rotated slightly relative into the page in contrast with the depiction of the apparatus 200 in FIG. 7B. Similar to FIG. 7B, to reduce the complexity and improve the clarity of FIG. 27B, the coupler C and the tubing T are depicted as simple circles.

FIGS. 28-32B illustrate another embodiment of an apparatus 2400 for removing a coupler from tubing in accordance with the teachings herein. In this embodiment, the cradle member includes a plurality of perpendicular protrusions for engaging the coupler. In some aspects, these perpendicular protrusions serve to prevent the coupler from sliding off the cradle member.

Other aspects of the apparatus 2400 are similar to corresponding aspects of the apparatus 200 of FIGS. 2-12B. Accordingly, the features described by the reference numbers (e.g., 2xx) for the apparatus 200 may correspond to similar reference numbers (e.g., 24xx) for the apparatus 2400. To avoid unnecessary repetition, some of these similar reference numbers are not discussed in the description of FIGS. 28-32B.

Similar to the apparatus 200, the apparatus 2400 includes elongated members 2402 and 2404 pivotally coupled along a pivot point 2406. The elongated member 2402 comprises a distal section 2412 comprising a cradle member 2412A, while the elongated member 2404 comprises a distal section 2414 comprising a clamp member 2414A.

Figure 28:
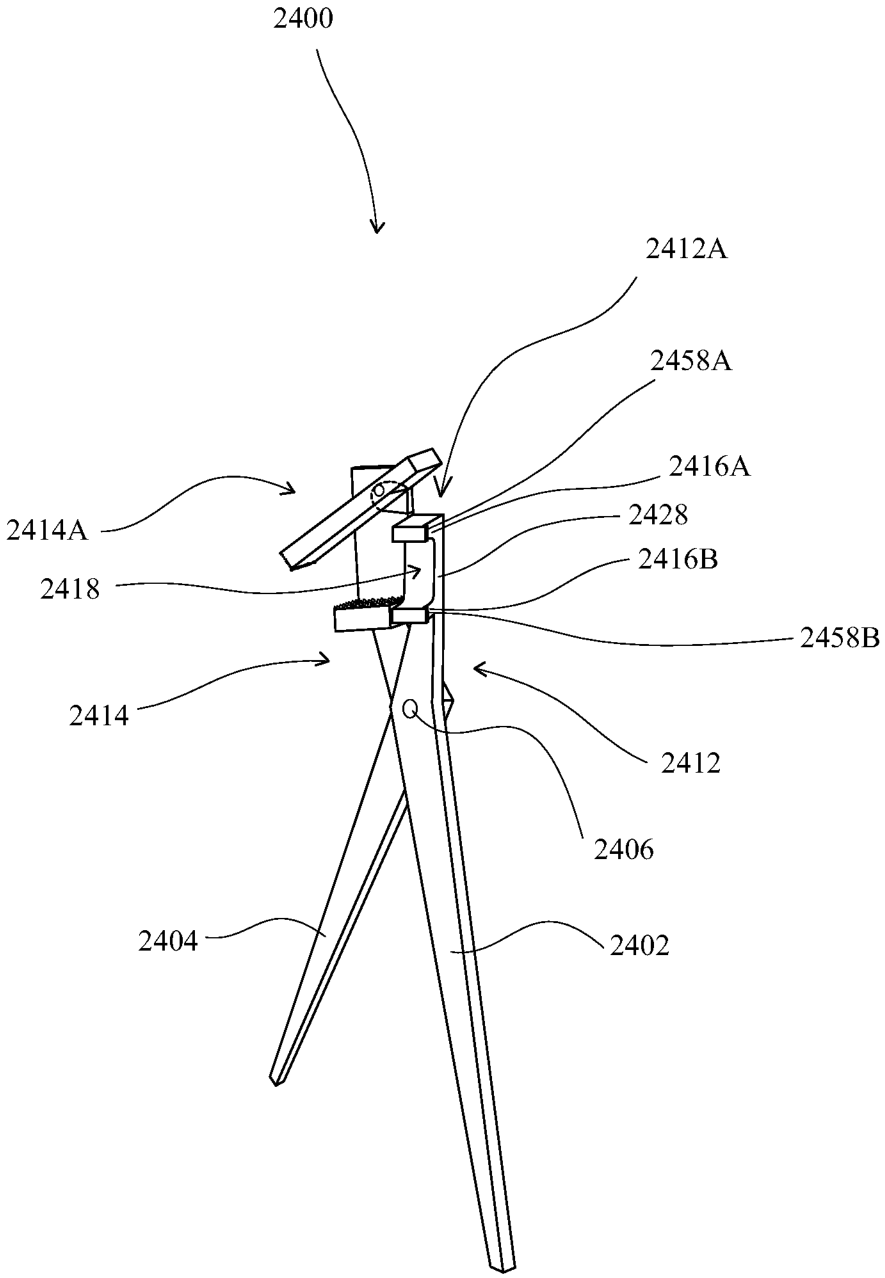
FIGS. 28-32B are simplified diagrams illustrating another embodiment of an apparatus for removing a coupler from tubing, wherein the cradle member of the apparatus comprises a plurality of perpendicular protrusions for engaging the coupler.

In FIG. 28, the cradle member 2412A comprises a plurality of perpendicular protrusions 2458A and 2458B that protrude from surfaces (e.g., coplanar with a surface 2428) of arms 2416A and 2416B, respectively, of the cradle member 2412A.

Figure 29:
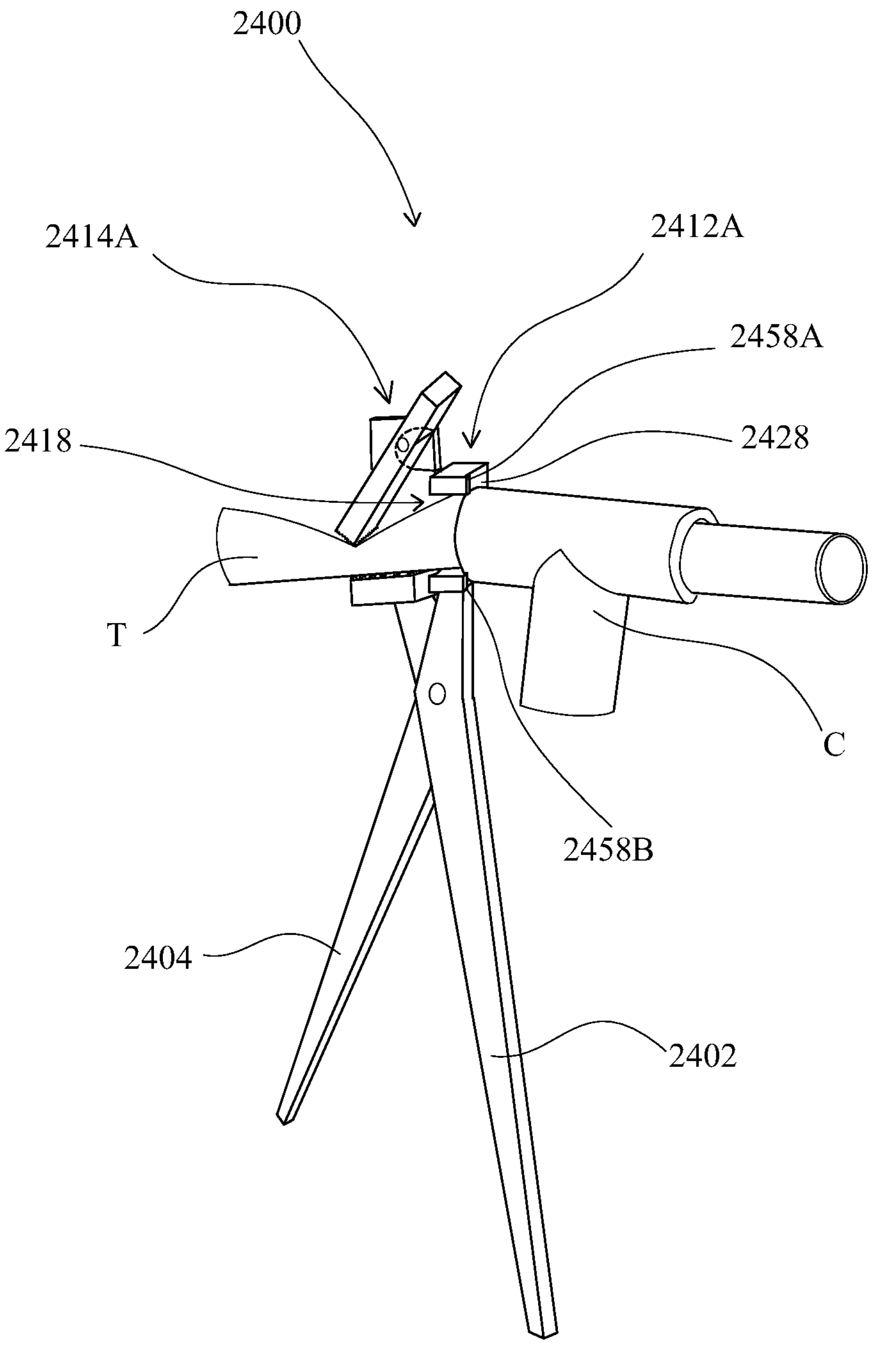

Consequently, as illustrated in FIG. 29, when the coupler C engages the surface 2428, the coupler C will be held in place by the perpendicular protrusions 2458A and 2458B which will slightly engage portions of the outer surface (along the circumference) of an end the coupler C. Consequently, the perpendicular protrusions 2458A and 2458B will tend to prevent the tubing T and coupler C from sliding out of the opening 2418 of the cradle member 2412A.

Figure 30:
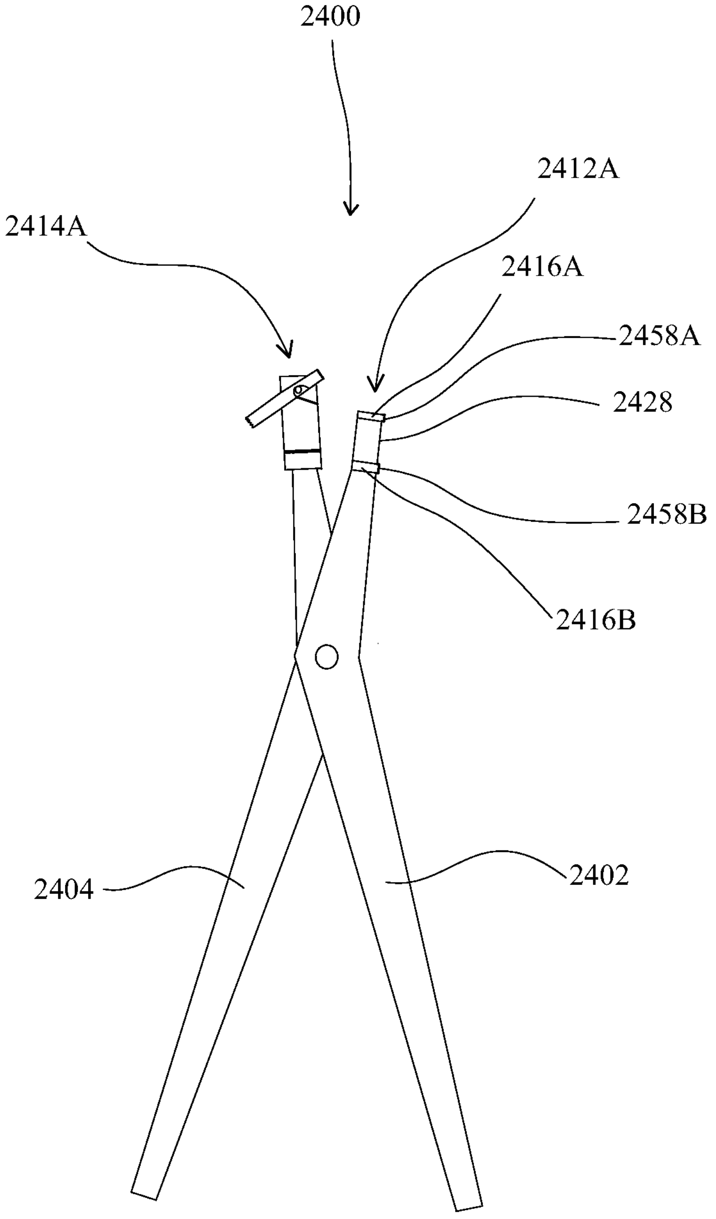

FIG. 30 illustrates a front-side view of the apparatus 2400. From this view, it may be readily observed that the perpendicular protrusions 2458A and 2458B extend outward slightly to the right (from this view) from the surface 2428.

Figure 31A:
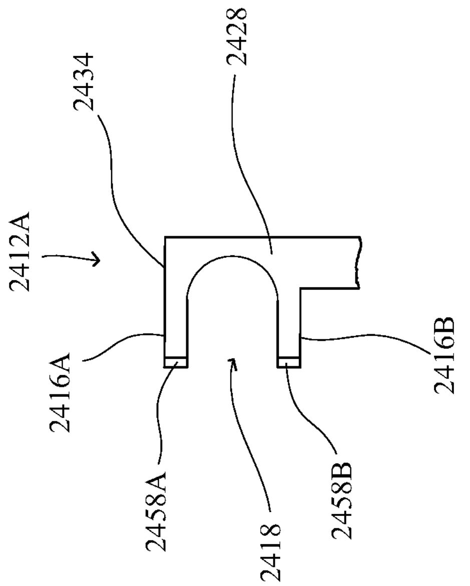
Figure 31B:
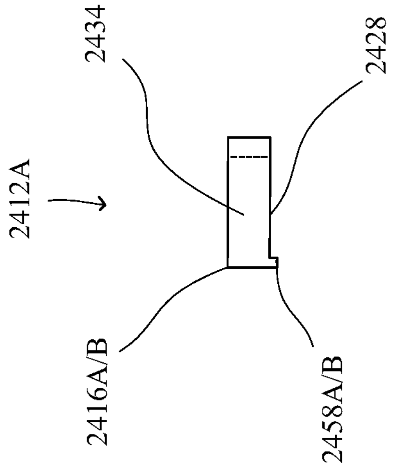

FIGS. 31A and 31B further illustrate the perpendicular protrusions 2458A and 2458B. FIG. 31A depicts the cradle member 2412A as seen from the right-hand side of FIG. 30. Here, the perpendicular protrusions 2458A and 2458B are on the top arm 2416A and the bottom arm 2416B, respectively, of the cradle member 2412A.

FIG. 31B depicts the top 2434 of the cradle member 2412A as seen from the top of the view of FIG. 31A. Again, it may be seen that the perpendicular protrusions 2458A and 2458B extend outward from the surface 2428.

Figure 32B:
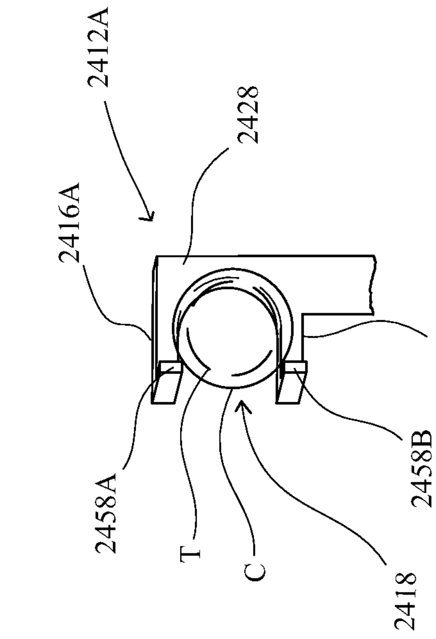
Figure 32A:
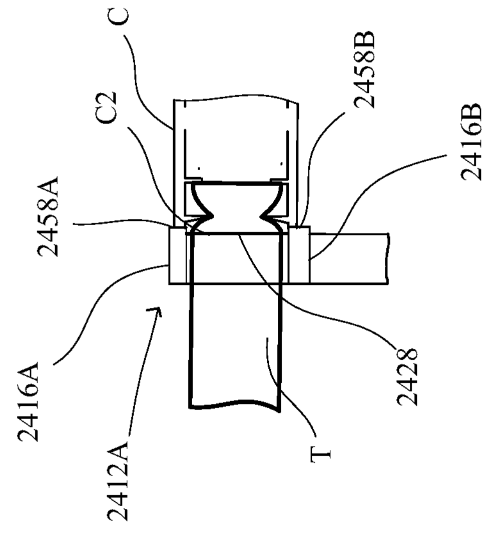

FIGS. 32A and 32B illustrate how the coupler C and the tubing T are positioned relative to the cradle member 2412A prior to removal of the coupler C from the tubing T. To facilitate a better understanding of the structure of these components, some hidden lines are depicted as solid lines in these figures.

FIG. 32A illustrates the left-most end C2 of the coupler C engaging the surface 2428 of the cradle member 2412A. Here, it may be seen that the end C2 lies (is recessed) within (i.e., to the left of, from this view) the right-hand side ends of the perpendicular protrusions 2458A and 2458B.

FIG. 32B illustrates the cradle member 2412A from the right-hand side of the view of FIG. 32A. Similar to FIG. 7B, to reduce the complexity and improve the clarity of FIG. 32B, the coupler C and the tubing T are depicted as simple circles. FIG. 32B illustrates that the coupler C lies (is recessed) within the perpendicular protrusions 2458A and

2458B, thereby preventing the coupler C from sliding out (i.e., to the left of, from this view) of the opening 2418 of the cradle member 2412A.

FIGS. 33-37B illustrate another embodiment of an apparatus 2900 for removing a coupler from tubing in accordance with the teachings herein. In this embodiment, the cradle member includes a plurality of angled/flared protrusions for engaging the coupler. In some aspects, these angled/flared protrusions serve to prevent the coupler from sliding off the cradle member as the handles are compressed together.

Other aspects of the apparatus 2900 are similar to corresponding aspects of the apparatus 200 of FIGS. 2-12B. Accordingly, the features described by the reference numbers (e.g., 2xx) for the apparatus 200 may correspond to similar reference numbers (e.g., 29xx) for the apparatus 2900. To avoid unnecessary repetition, some of these similar reference numbers are not discussed in the description of FIGS. 33-37B.

Similar to the apparatus 200, the apparatus 2900 includes elongated members 2902 and 2904 pivotally coupled along a pivot point 2906. The elongated member 2902 comprises a distal section 2912 comprising a cradle member 2912A, while the elongated member 2904 comprises a distal section 2914 comprising a clamp member 2914A.

Figure 33:
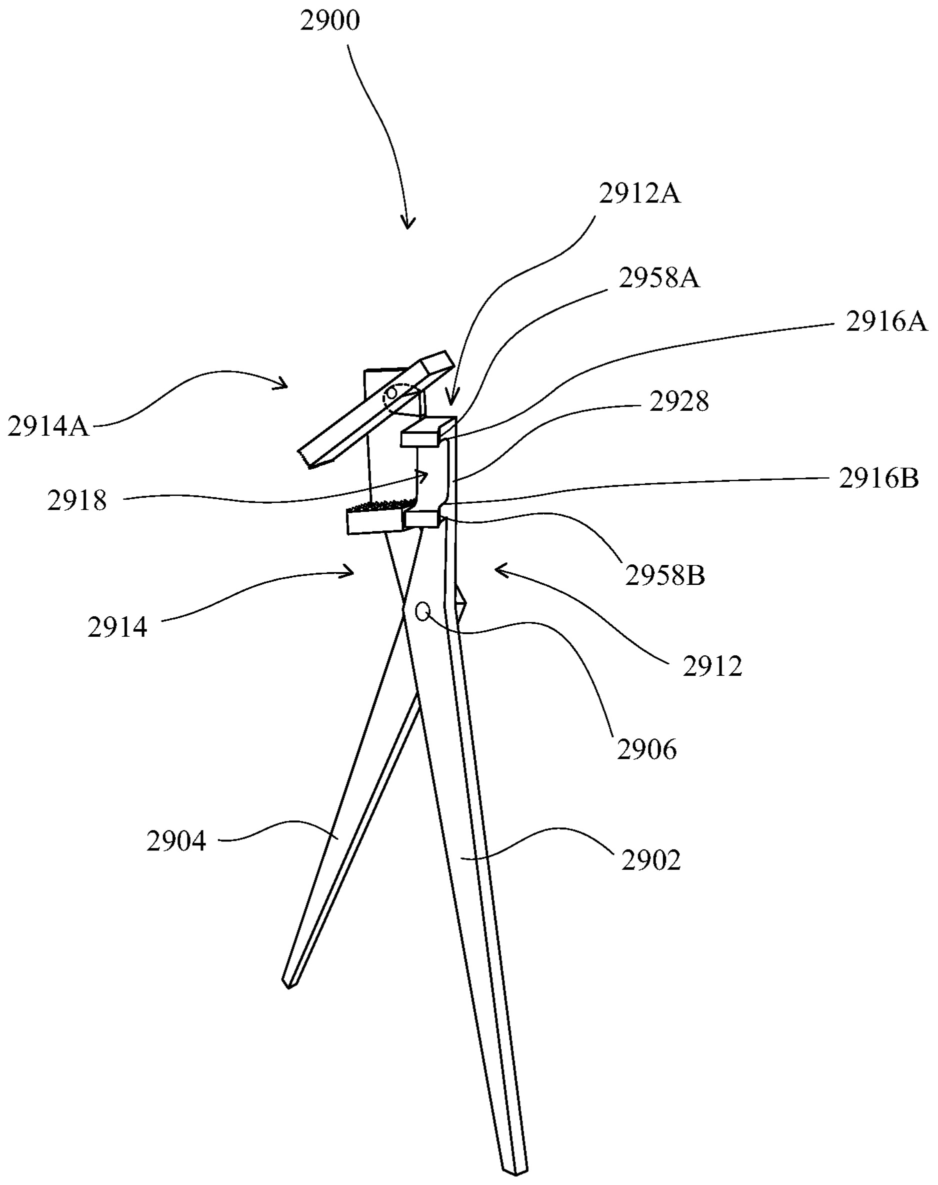
FIGS. 33-37B are simplified diagrams illustrating another embodiment of an apparatus for removing a coupler from tubing, wherein the cradle member of the apparatus comprises a flared edge (e.g., a plurality of angled/flared protrusions) for engaging the coupler.

In FIG. 33, the cradle member 2912A comprises a plurality of angled/flared protrusions 2958A and 2958B that angle/flare out from surfaces (e.g., substantially coplanar with a surface 2928) of arms 2916A and 2916B, respectively, of the cradle member 2912A.

Figure 34:
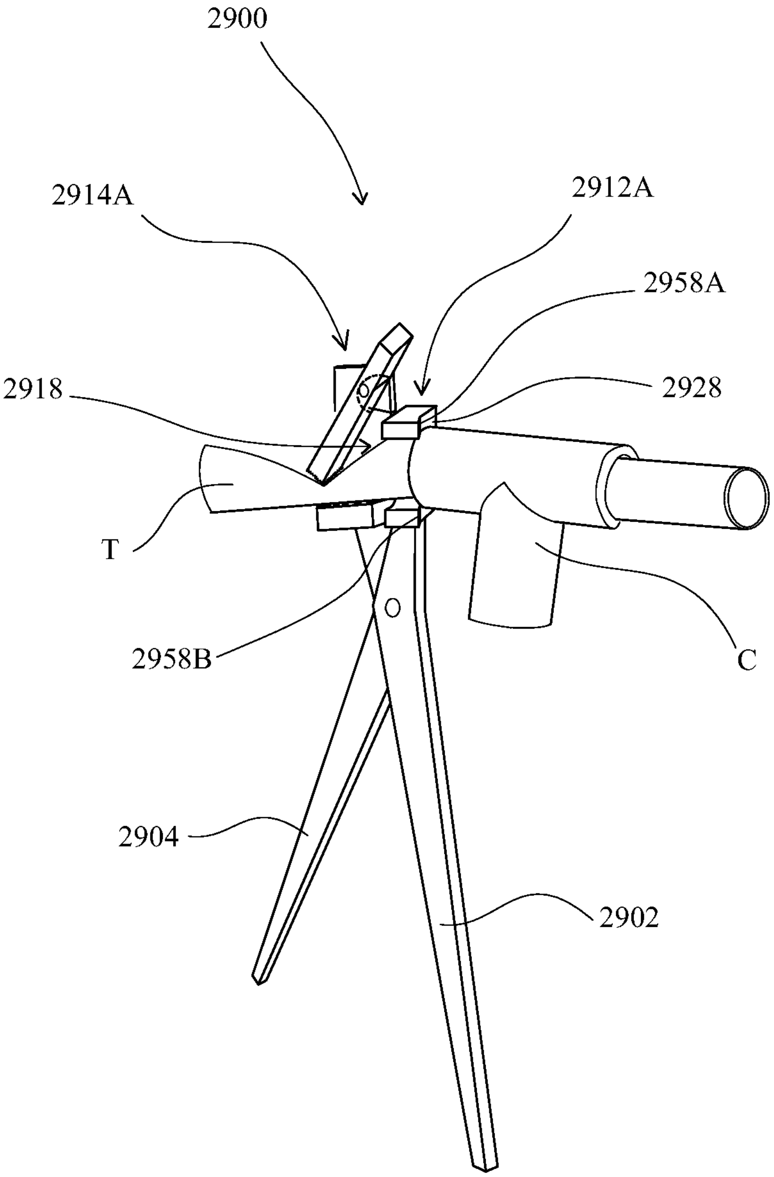

Consequently, as illustrated in FIG. 34, when the coupler C engages the surface 2928, the coupler C will be held in place by the angled/flared protrusions 2958A and 2958B which will slightly engage portions of the outer surface (along the circumference) of an end the coupler C. Consequently, the angled/flared protrusions 2958A and 2958B will tend to prevent the tubing T and coupler C from sliding out of the opening 2918 of the cradle member 2912A.

Figure 35:
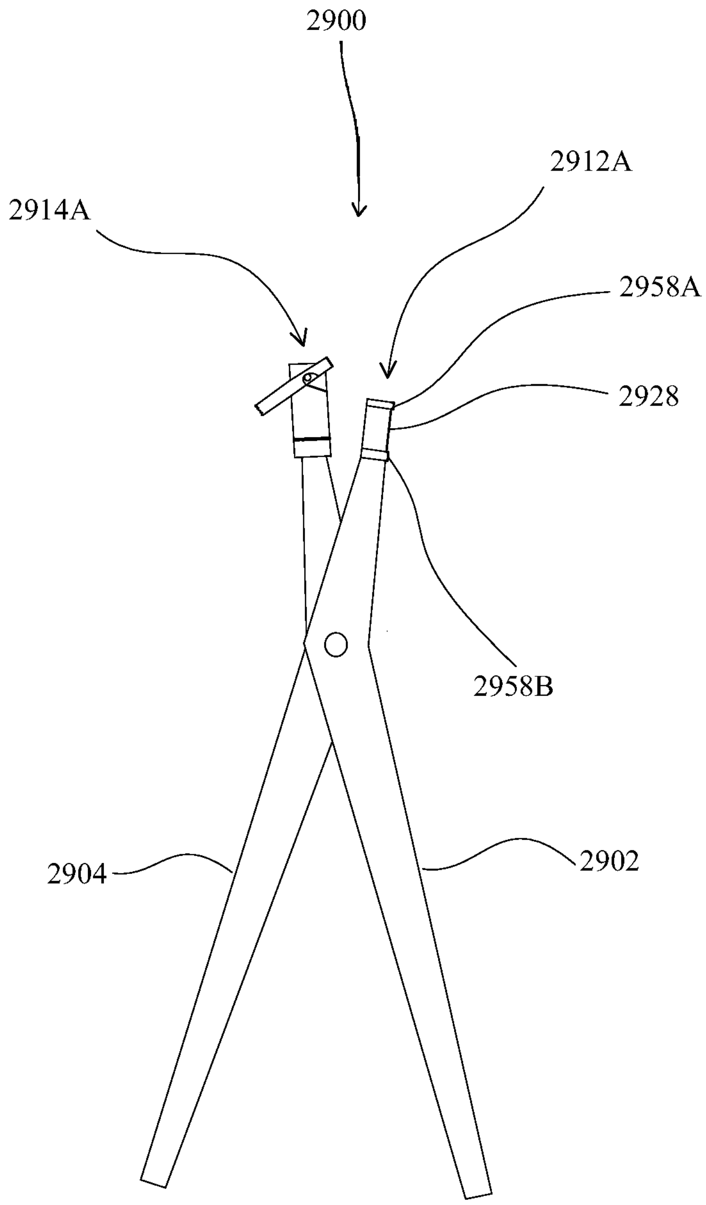

FIG. 35 illustrates a front-side view of the apparatus 2900. From this view, it may be readily observed that the angled/flared protrusions 2958A and 2958B extend outward slightly from the surface 2928.

Figure 36A:
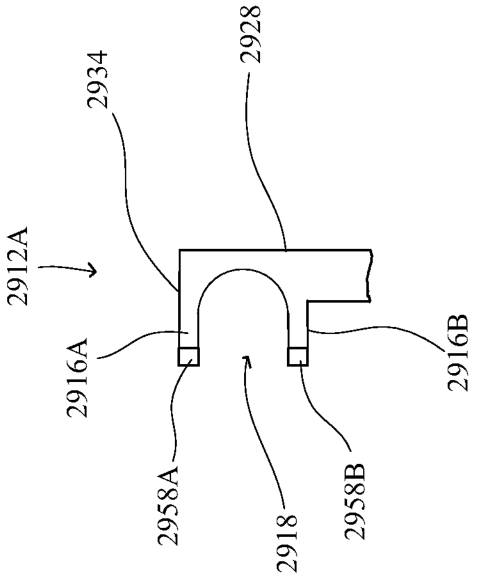
Figure 36B:
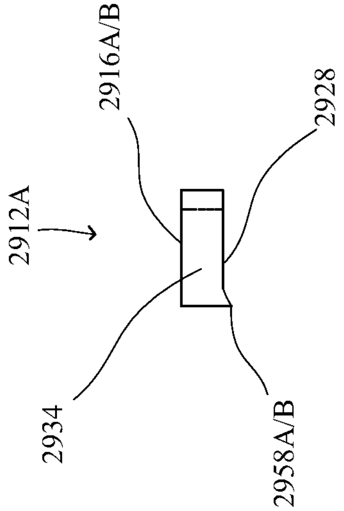

FIGS. 36A and 36B further illustrate the angled/flared protrusions 2958A and 2958B. FIG. 36A depicts the cradle member 2912A as seen from the right-hand side of FIG. 35. Here, the angled/flared protrusions 2958A and 2958B are on the top arm 2916A and the bottom arm 2916B, respectively, of the cradle member 2912A.

FIG. 36B depicts the top 2934 of the cradle member 2912A as seen from the top of the view of FIG. 36A. Again, it may be seen that the angled/flared protrusions 2958A and 2958B extend outward from the surface 2928.

Figure 37B:
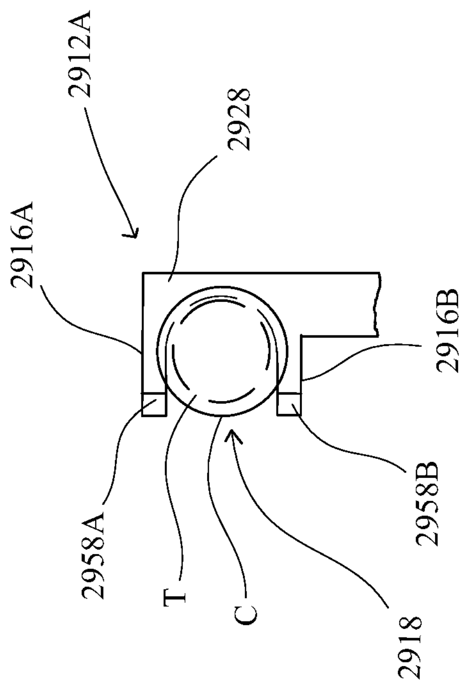
Figure 37A:
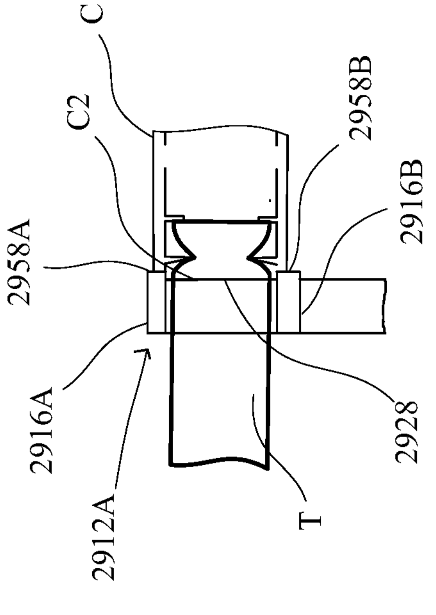

FIGS. 37A and 37B illustrate how the coupler C and the tubing T are positioned relative to the cradle member 2912A prior to removal of the coupler C from the tubing T. FIG. 37A illustrates the left-most end C2 of the coupler C engaging the surface 2928 of the cradle member 2912A. Here, it may be seen that the end C2 lies (is recessed) within (i.e., to the left of, from this view) of the right-hand side ends of the angled/flared protrusions 2958A and 2958B. FIG. 37B also illustrates that the coupler C lies within the angled/flared protrusions 2958A and 2958B, thereby preventing the coupler C from sliding out (i.e., to the left of, from this view) of the opening 2918 of the cradle member 2912A. Similar to FIG. 7B, to reduce the complexity and improve the clarity of FIG. 37B, the coupler C and the tubing T are depicted as simple circles.

FIGS. 38-42B illustrate another embodiment of an apparatus 3400 for removing a coupler from tubing in accordance with the teachings herein. In this embodiment, the cradle member comprises a partially cylindrical wall (e.g., a cup-like feature) for engaging the coupler. In some aspects, this partially cylindrical wall serves to securely hold the coupler within the cradle member.

Other aspects of the apparatus 3400 are similar to corresponding aspects of the apparatus 200 of FIGS. 2-12B. Accordingly, the features described by the reference numbers (e.g., 2xx) for the apparatus 200 may correspond to similar reference numbers (e.g., 34xx) for the apparatus 3400. To avoid unnecessary repetition, some of these similar reference numbers are not discussed in the description of FIGS. 38-42B.

Similar to the apparatus 200, the apparatus 3400 includes elongated members 3402 and 3404 pivotally coupled along a pivot point 3406. The elongated member 3402 comprises a distal section 3412 comprising a cradle member 3412A, while the elongated member 3404 comprises a distal section 3414 comprising a clamp member 3414A.

Figure 38:
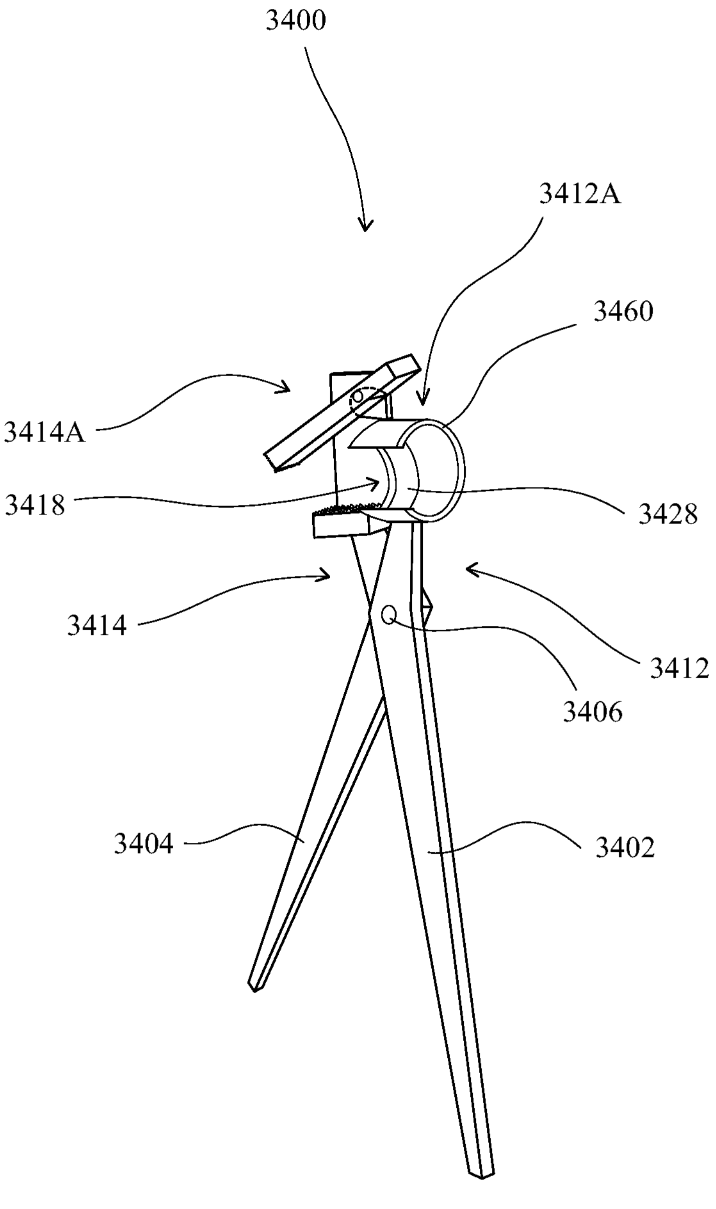
FIGS. 38-42B are simplified diagrams illustrating another embodiment of an apparatus for removing a coupler from tubing, wherein the cradle member of the apparatus comprises a cup-like feature for engaging the coupler.

In FIG. 38, the cradle member 3412A comprises a partially cylindrical wall 3460 that is oriented substantially (e.g., approximately or exactly) perpendicular to a surface 3428 of the cradle member 3412A.

Figure 39:
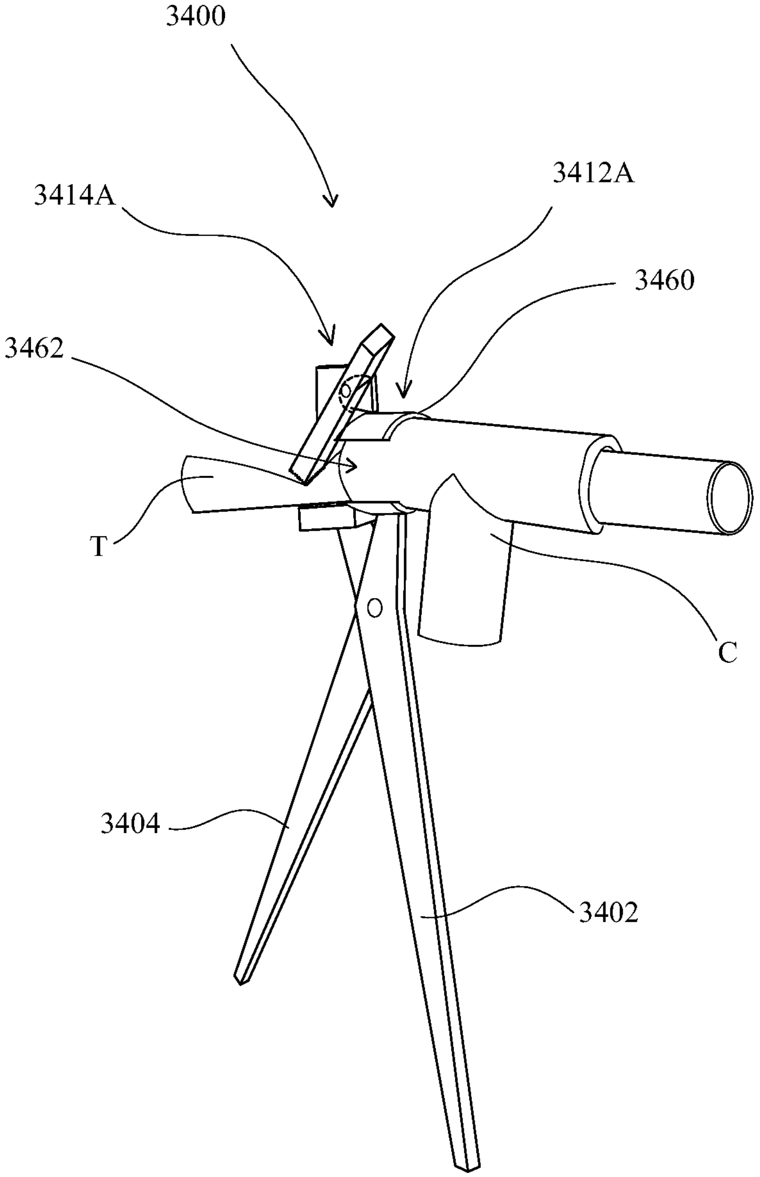

Referring to FIG. 39, when the left-hand side of the coupler C engages the surface 3428 (not shown in FIG. 39), the coupler C will also be held in place by the partially cylindrical wall 3460 which will engage at least one side (i.e., the outer surface) of the coupler C. Consequently, the partially cylindrical wall 3460 will tend to prevent the tubing T and the coupler C from disengaging with (from) the cradle member 3412A. Of note, a front-side opening 3462 in the partially cylindrical wall 3460 is wide enough to allow the tubing to be inserted (sideways within the cradle—as an "assembly") through the front-side opening 3462. However, the front-side opening 3462 is smaller than the diameter of the coupler C, as shown in FIG. 39.

Figure 40:
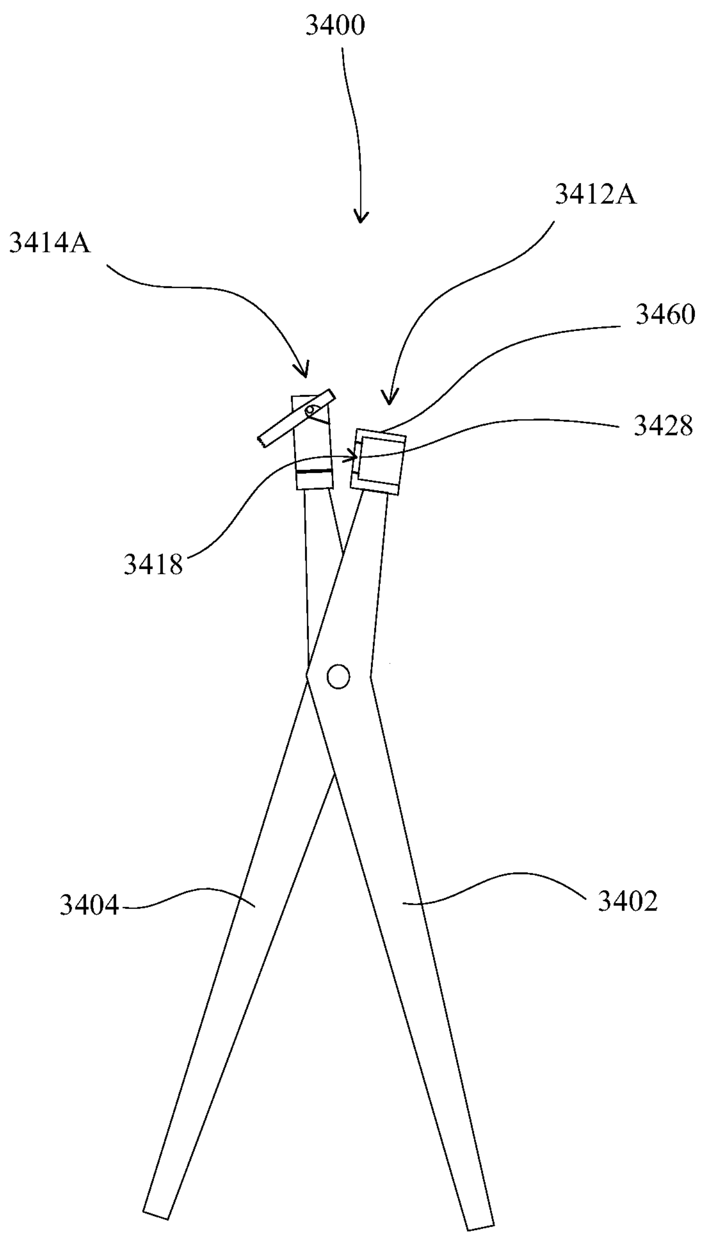

FIG. 40 illustrates a front-side view of the apparatus 3400. From this view, it may be observed that the surface 3428 of the cradle member 3412A (within the cup-like feature of the cradle member 3412A) prevents the coupler C from moving toward the left (from this view) through the opening 3418, while the partially cylindrical wall 3460 securely keeps the coupler C in place within the cradle member 3412A.

Figure 41B:
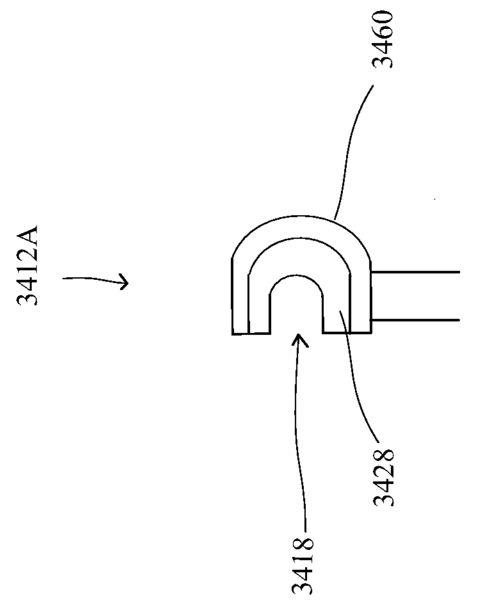
Figure 41A:
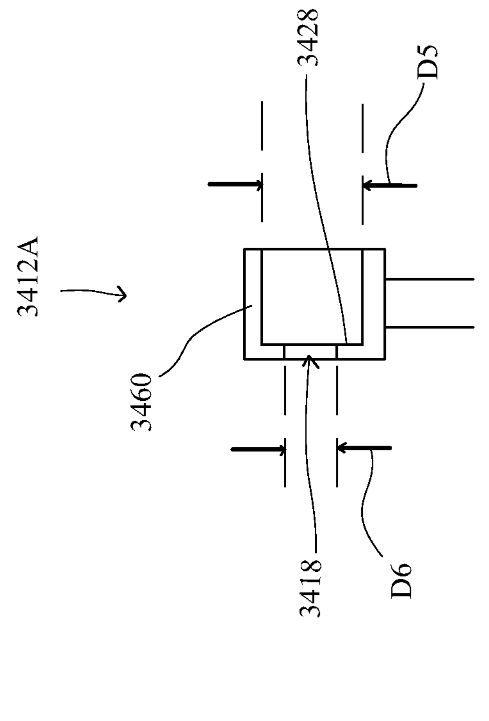

FIGS. 41A and 41B further illustrate the partially cylindrical wall 3460. FIG. 41A depicts the cradle member 3412A from the same view as FIG. 40.

The view of FIG. 41A shows the dimension D5 of the inner diameter of the partially cylindrical wall 3460 and the dimension D6 of the opening 3418. The dimensions D5 and D6 may be sized in different embodiments to accommodate different sizes of tubing and couplers. For example, in various embodiments, the partially cylindrical wall 3460 may have an inner diameter D5 within a range of approximately 3/8 of an inch to approximately 1 inch. In various embodiments, the opening 3418 may have a width D6 within a range of approximately 5/16 of an inch to approximately 3/4 of an inch.

FIG. 41B depicts the cradle member 3412A as seen from the right-hand side of FIG. 41A. This view more clearly illustrates the opening 3418 through which the tubing passes and the surface 3428 that engages an end of the coupler, preventing the coupler from passing through opening 3418 of the cradle member 3412A.

Figure 42A:
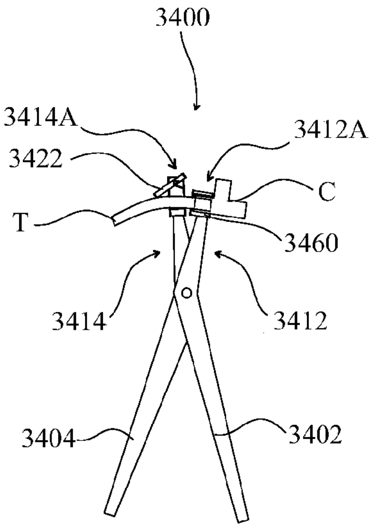
Figure 42B:
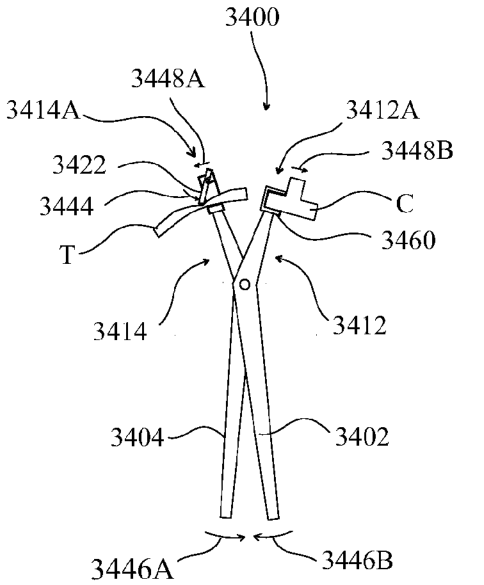

FIGS. 42A and 42B illustrate the two-step process of removing the coupler C from the tubing T through the use of the apparatus 3400. In FIG. 42A, the coupler C and the tubing T (coupled together) are positioned within the cradle member 3412A of the elongated member 3402 and the clamp member 3414A of the elongated member 3404, respectively. In this case, the coupler C is securely held within the partially cylindrical wall 3460. In FIG. 42B, the rotating member 3422 has been rotated counter-clockwise and has engaged the tubing T, as indicated by arrow 3444. In addition, the handles of the elongated member 3402 and the elongated member 3404 have been compressed together, as indicated by arrows 3446A and 3446B. This action thus results in the cradle member 3412A and the clamp member 3414A being further separated from one another, as indicated by arrows 3448A and 3448B, while the partially cylindrical wall 3460 prevents the coupler C and the tubing T from disengaging with (from) the cradle member 3412A until the removal of the coupler C from the tubing T is complete.

As mentioned above, in some embodiments, mechanisms for engaging a coupler and tubing are located at an intermediate section of a coupler removal apparatus (as opposed to the embodiments of FIGS. 2-42B where the mechanisms for engaging a coupler and tubing are located at a distal section of a coupler removal apparatus). Thus, an apparatus constructed in accordance with the teachings herein may comprise an A-frame configuration where, when the apparatus is in an upright orientation, the pivot point is above both the cradle member and the clamp member. In this case, a user would pull the tubing and coupler apart by pulling the handles of the apparatus apart. Accordingly, the pivot point may be located at the distal sections of the elongated members of the apparatus; while the cradle member and the clamp member may be located at intermediate sections of the elongated members (e.g., lower portions of the distal sections, or at even lower portions that are closer to the proximal handle sections). For example, a distance from a pivot pin to the distal ends of the elongated members may be within a range of approximately ¼ of an inch to approximately 2 inches; while a distance from the pivot pin to the cradle member and/or the clamp member may be within a range of approximately 2 inches to approximately 6 inches.

Figure 43:
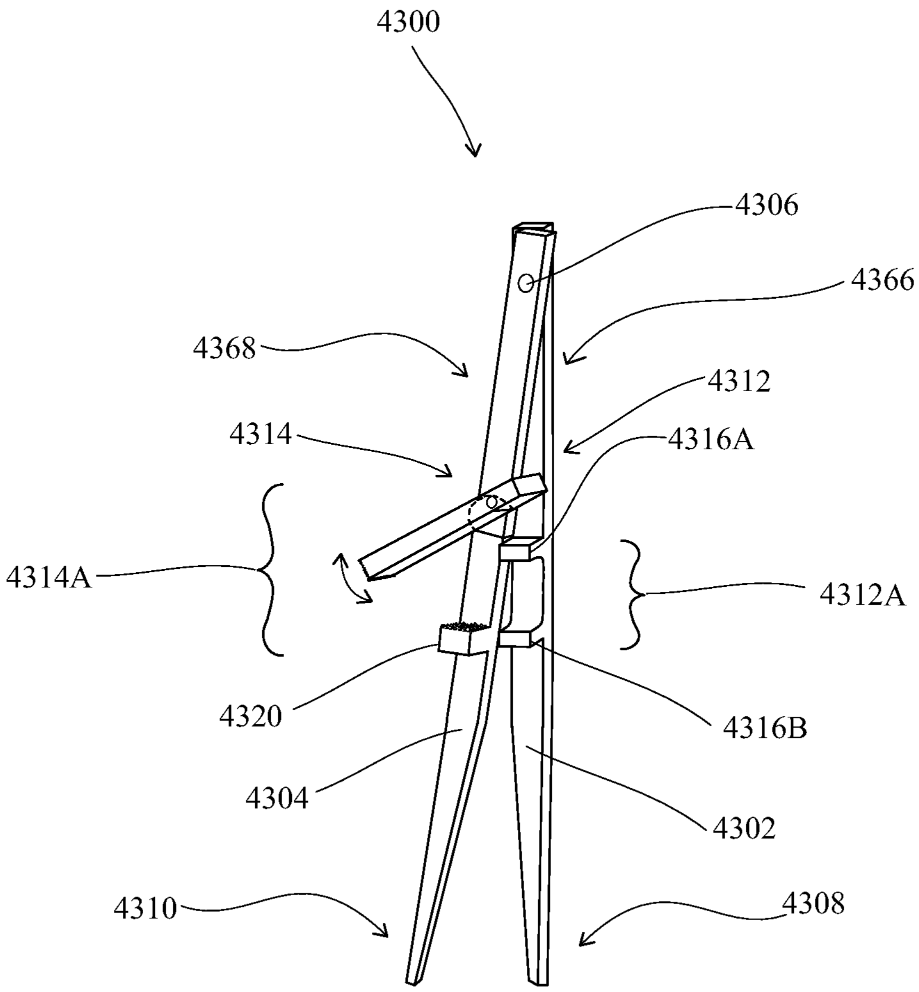
FIGS. 43-47 are simplified diagrams illustrating another embodiment of an apparatus for removing a coupler from tubing, where a pivot point is at a distal section of the apparatus.

FIG. 43 illustrates an embodiment of an apparatus 4300 comprising a first elongated member 4302 and a second elongated member 4304 where a pivot point 4306 is at distal sections 4366 and 4368 (e.g., near the distal ends) of the elongated members 4302 and 4304, respectively. In this perspective view, the right-hand side of the apparatus 4300 has been rotated out from the page slightly. Proximal sections 4308 and 4310 of the elongated members 4302 and 4304, respectively, effectively provide handles that may be used by a person to operate the apparatus 4300. An intermediate section 4312 of the elongated member 4302 comprises a cradle member 4312A for engaging a coupler (not shown in FIG. 43). An intermediate section 4314 of the elongated member 4304 comprises a clamp member 4314A for engaging tubing (not shown in FIG. 43).

In the example of FIG. 43, each of the elongated members 4302 and 4304 are shown as having a relatively consistent thickness (i.e., in the dimension that is substantially perpendicular to the page). In addition, the lengths of the arms 4316A and 4316B of the cradle member 4312A are substantially the same as the length of the lower wall 4320 of the clamp member 4314A (i.e., in the dimension that is substantially perpendicular to the page). In such an implementation, in operation, there may be a slight misalignment between the coupler (not shown) and the tubing (not shown) due to the offset of the elongated members 4302 and 4304 at the pivot point 4306. In FIG. 43, this offset in the dimension that is substantially perpendicular to the page, is shown by the elongated member 4304 being in front of the elongated member 4302. FIGS. 44-47 illustrate two examples of how a coupler removal apparatus may be configured to address such a misalignment.

Figure 44:
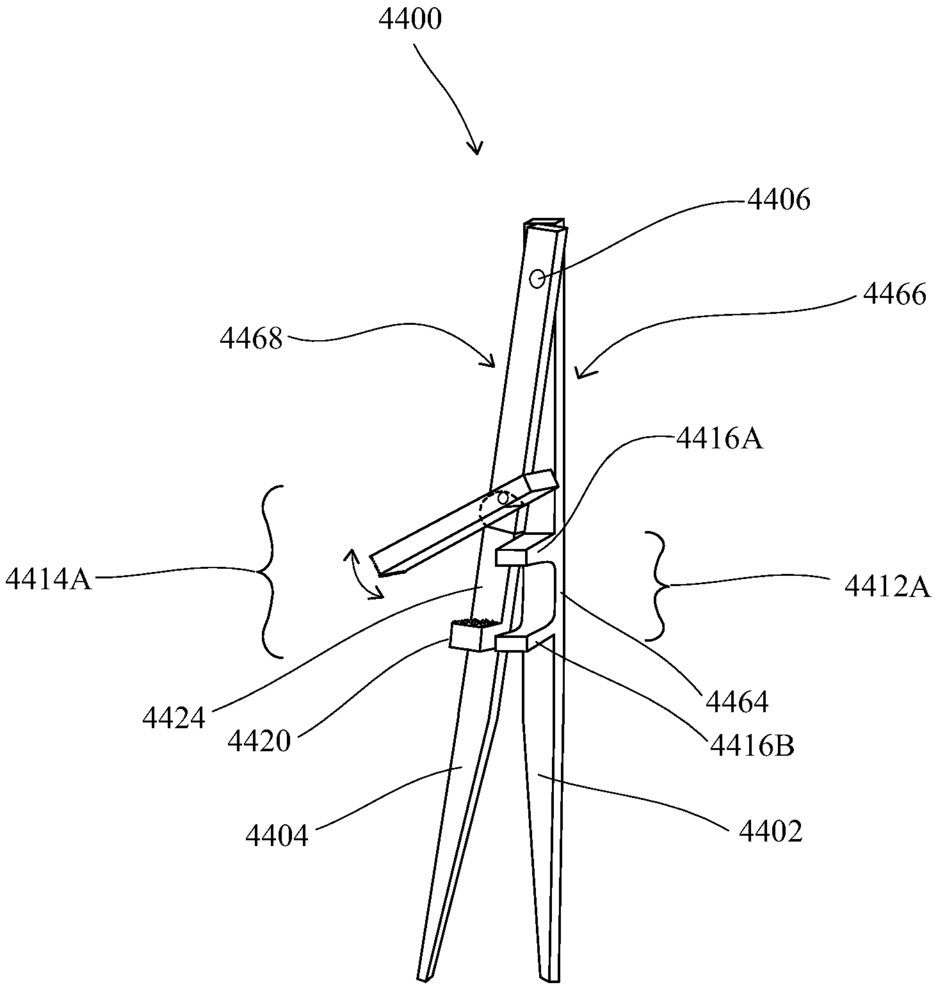

FIG. 44 illustrates an embodiment of an apparatus 4400. Similar to FIG. 43, in the perspective view of FIG. 44, the right-hand side of the apparatus 4400 has been rotated out from the page slightly.

In the apparatus 4400, the arms 4416A and 4416B of the cradle member 4412A are extended slightly to compensate for the offset of the elongated members 4402 and 4404 at the pivot point 4406. Consequently, the ends (outward from the page) of the arms 4416A and 4416B will substantially align with the end (outward from the page) of the lower wall 4420 of the clamp member 4414A.

In the example of FIG. 44, however, the width of the section 4464 of the cradle member 4412A has not been increased to compensate for the offset of the elongated members 4402 and 4404 at the pivot point 4406. Thus, in operation, there may be a space behind the tubing within the cradle member 4412A (i.e., between the back of the tubing and the section 4464) when the tubing is flush against the side wall 4424 of the clamp member 4414A. Thus, in the absence of a thicker section 4464 (i.e., in the dimension that is substantially perpendicular to the page), a slight misalignment between the coupler and the tubing may occur.

Figure 45:
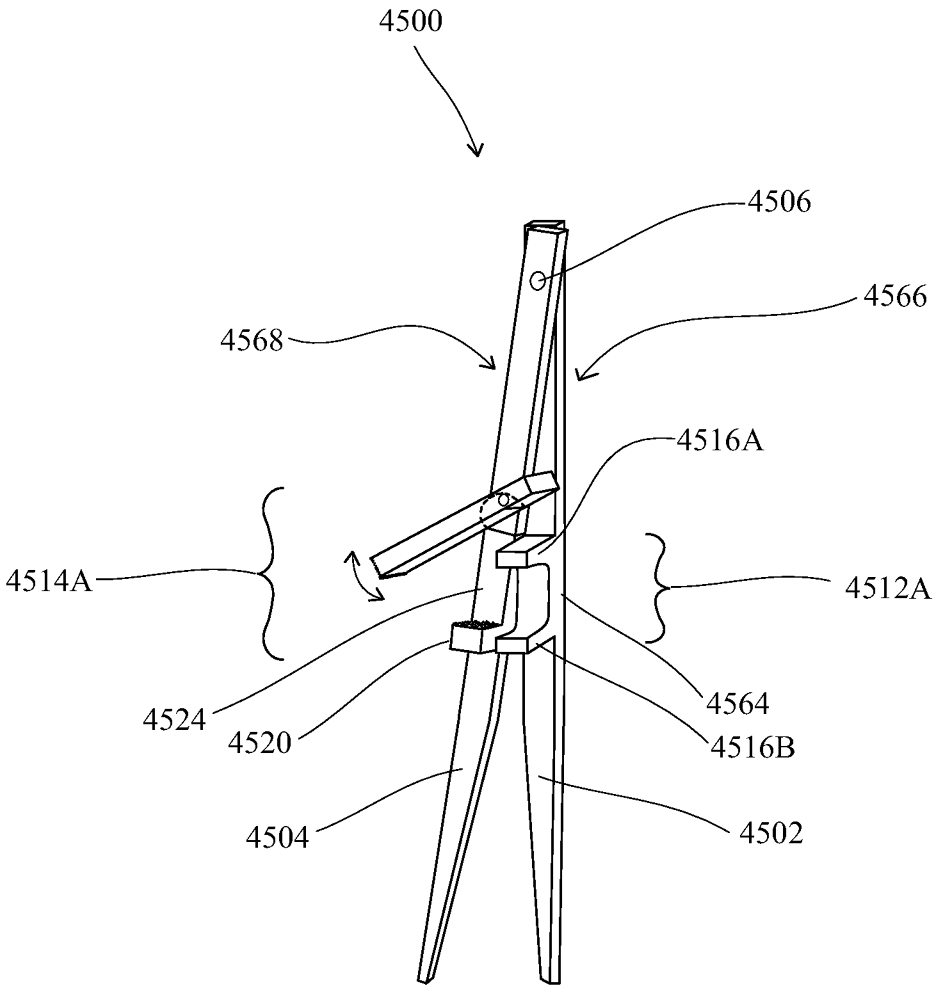

FIG. 45 illustrates an embodiment of an apparatus 4500 where the width of the section 4564 of the cradle member 4512A has been increased to compensate for the offset of the elongated members 4502 and 4504 at the pivot point 4506. Thus, in operation, there might not be a space behind the tubing within the cradle member 4512A (i.e., between the back of the tubing and the section 4564) when the tubing is flush against the side wall 4524 of the clamp member 4514A. Consequently, through the use of a thicker section 4564 (i.e., in the dimension that is substantially perpendicular to the page), misalignment between the coupler and the tubing may be avoided.

Figure 46:
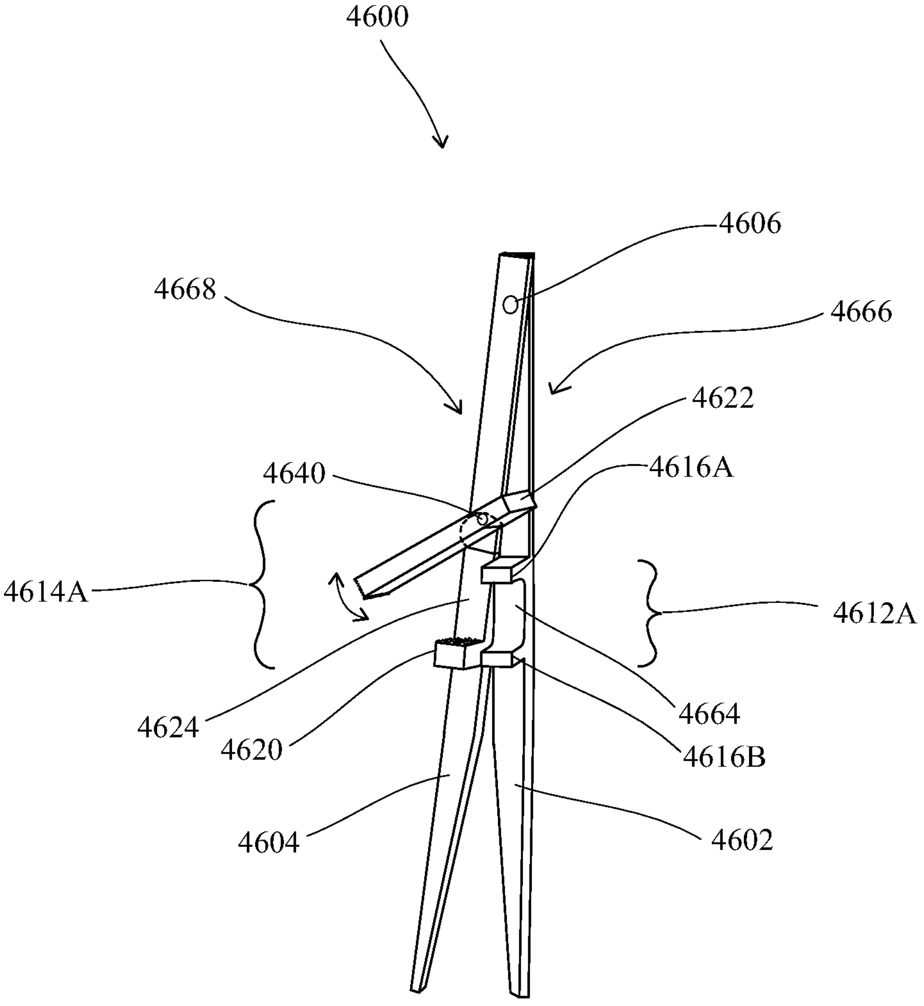
Figure 47:
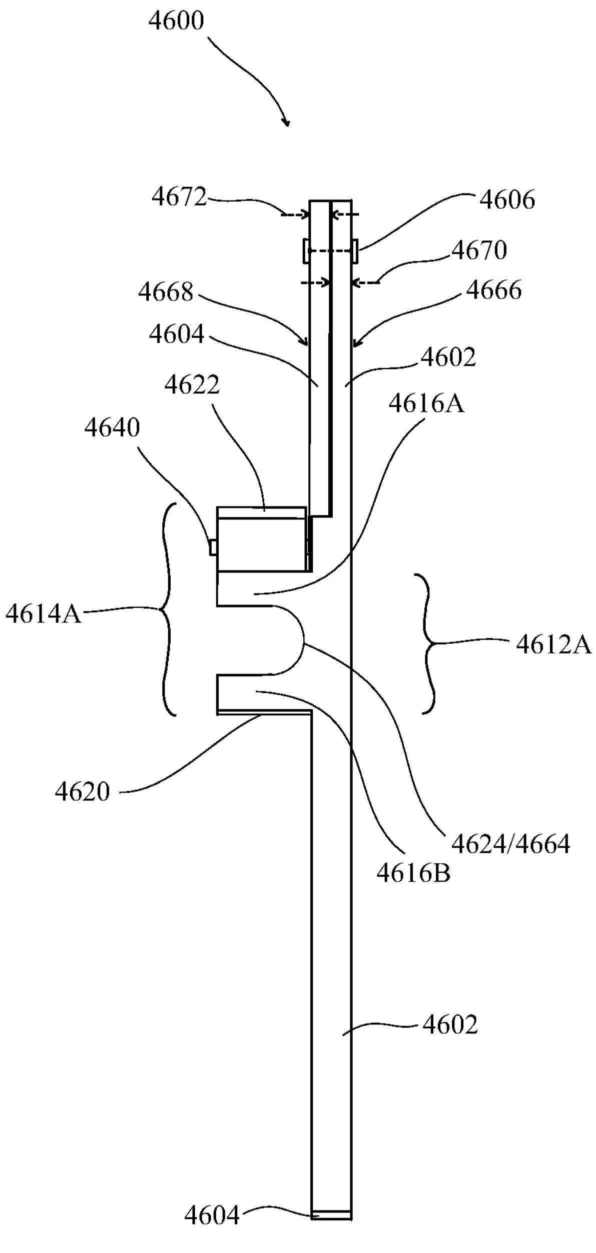

FIGS. 46 and 47 illustrate an embodiment of an apparatus 4600 where the thicknesses of the distal sections 4666 and 4668 of the elongated members 4602 and 4604, respectively, are reduced to compensate for the offset of the elongated members 4602 and 4604 at the pivot point 4606. FIG. 46 depicts a perspective view where the right-hand side of the apparatus 4600 has been rotated out from the page slightly. FIG. 47 depicts a view from the right side of the view of FIG. 46 to better illustrate the reduced thicknesses of the distal sections 4666 and 4668 of elongated members 4602 and 4604, respectively. In the view of FIG. 47, substantial portions of the elongated member 4604 and the clamping member 4614A are hidden by the elongated member 4602 and the cradle member 4612A.

In a typical embodiment (e.g., as shown in FIG. 47), the respective thicknesses 4670 and 4672 of the distal sections 4666 and 4668 (e.g., the thicknesses of these sections from the distal ends of the elongated members 4602 and 4604, respectively, to just above the cradle member 4612A and the clamp member 4614A) of the apparatus 4600 may be half the thicknesses of corresponding distal sections 4366 and 4368 of the apparatus 4300 of FIG. 43. Consequently, the ends of the arms 4616A and 4616B will substantially align with the end of the lower wall 4620 of the clamp member 4614A. In addition, in operation, tubing will fully engage both the side wall 4624 of the clamp member 4614A and the section 4664 of the cradle member 4612A. Consequently, misalignment between the coupler and the tubing may be avoided in this case.

By halving the thicknesses of the distal sections 4666 and 4668 to align the front surface (from the view of FIG. 46) of the side wall 4624 of the clamping member 4614A with the front surface (from the view of FIG. 46) of the section 4664 of the cradle member 4612A, the thickness of the section 4664 need not be thickened (e.g., as in the case for the section 4564 of the apparatus 4500). Rather, the section 4664 may be the same thickness as the proximal end of the member 4602 (e.g., as in the case for the section 4464 of the apparatus 4400).

The components of the apparatuses 4300, 4400, 4500, and 4600 may be similar to corresponding components described in any prior embodiment. That is, in some cases, features described by the reference numbers (e.g., 2xx) for the apparatus 200 may correspond to similar reference numbers (e.g., 43xx, 44xx, 45xx, or 46xx) for the apparatus 4300, 4400, 4500, or 4600. For example, a pivot-based coupling at the pivot point 4306, 4406, 4506, or 4606 may be implemented in a similar manner as the pivot-based couplings described above for the pivot point 206 of FIG. 2, or as described in any other embodiment herein. The cradle member 4312A, 4412A, 4512A, or 4612A may be implemented in a similar manner as the cradle member 212A of FIG. 2 or any other cradle member described in any other embodiment herein. The clamp member 4314A, 4414A, 4514A, or 4614A may be implemented in a similar manner as the clamp member 214A of FIG. 2 or any other clamp member described in any other embodiment herein. To avoid unnecessary repetition, not all of these similar reference numbers are shown and/or discussed in the description of FIGS. 43-47.

Also, the offset issues described above with reference to FIGS. 43-47 may exist in embodiments other than the A-frame embodiments (e.g., the embodiments of FIGS. 2-42B). Consequently, it should be appreciated that other embodiments described herein may be modified to incorporate structure as described in any of FIGS. 44-47 to address this offset issue (e.g., to prevent misalignment between the coupler and tubing) in some implementations even though this structure is not explicitly shown in those other embodiments. For example, the apparatus 200 may be configured such that the tubing-side surface of the side wall 224 of the clamping member 214A (e.g., see FIGS. 9A and 9B) is aligned with the vertical surface (within the opening 218) between the arms 216A and 216B of the cradle member 212A (e.g., see FIG. 2) to prevent misalignment between the coupler and the tubing.

Figure 1B:
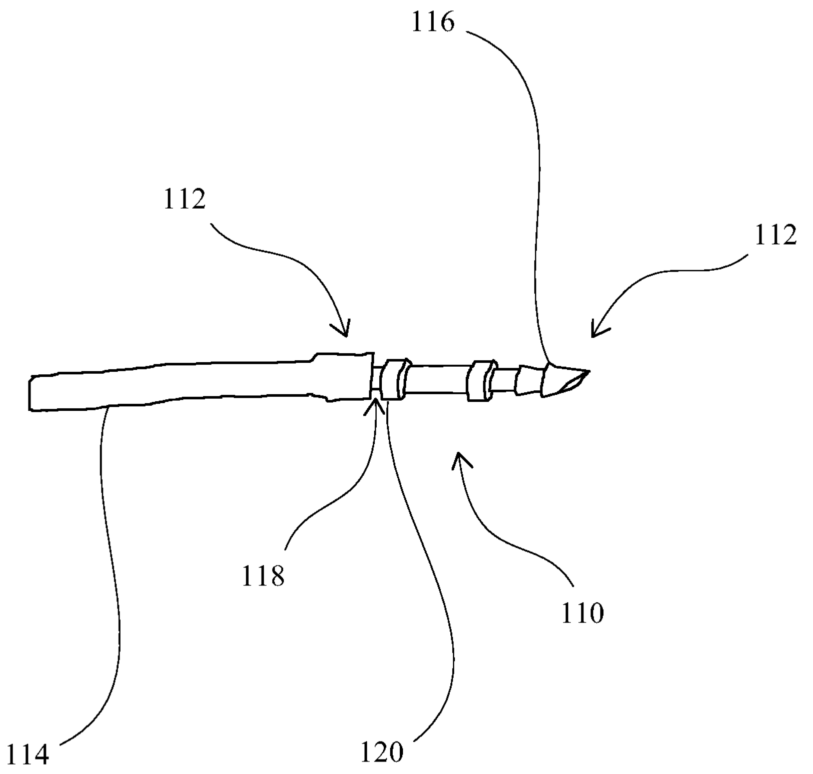
FIG. 1B is a simplified diagram of an expansion coupler onto which a section of tubing is placed.

As mentioned above, the teachings herein are also applicable to the removal of an expansion coupler from tubing. For example, an apparatus constructed in accordance with the teachings herein may be used to remove couplers, emitters, etc., from irrigation tubing or other suitable types of tubing. Here, the dimensions of the apparatus (in particular, the cradle member) are sized to accommodate the surfaces of the coupler and tubing that will be engaged. For example, the opening of the cradle member will be sized to enable a narrower circumference of the coupler (e.g., section 118 in FIG. 1B) to be placed within the opening, while preventing a wider section of the coupler (e.g., section 120 in FIG. 1B) from passing through the cradle member (e.g., in a leftward direction in FIG. 1B). Thus, when the clamping member engages the tubing (e.g., tubing 114), the tubing and the coupler will be pulled apart upon compression of the handles of the apparatus.

A coupler removal apparatus as taught herein may be implemented in a variety of configurations. For example, such an apparatus may be constructed to operate either to the right or to the left (mirror images). Also, different apparatuses may be constructed where the relative positions of the elongated members are reversed. For example, in the implementation of FIG. 2, the elongated member 202 having the cradle member is shown as being "above" the elongated member 204 at the pivot point 206, In contrast, in the implementation of FIG. 43, the elongated member 4302 having the cradle member is shown as being "below" the elongated member 4304 at the pivot point 4306. It should thus be appreciated that the positioning of the elongated members may be reversed in any of the disclosed embodiments. In addition, various modifications of the shape of such an apparatus may be made consistent with the teachings herein. For example, as compared to the embodiments explicitly shown herein, a given apparatus may employ different shaped cradle members, different shaped clamp members, different pivoting mechanisms, different handle shapes, and so on. Also, in view of the teachings herein it should be appreciated that mechanisms other than those specifically shown may be used to provide a cradle member, a clamp member, and a pivoting mechanism for such an apparatus. Furthermore, the dimensions set forth herein are simply examples of dimensions that could be used in some embodiments. It should be appreciated that other dimensions may be used in other embodiments.

The teachings herein also may be implemented in a variety of ways. For example, the structure and functionality taught herein may be incorporated into various types of tools (e.g., of various sizes and/or configurations) and into other types of apparatuses. As another example, an apparatus as taught herein may be constructed using a variety of components and materials. Such an apparatus may be made of a plastic material, a metallic material, a composite material, wood, some other material, or any combination of these materials.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Moreover, any reference to elements herein using a designation such as "first," "second," and so forth does not generally limit the quantity or order of those elements. Rather, these designations may be used herein as a convenient method of distinguishing between two or more different elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

While certain embodiments have been described above in detail and shown in the accompanying drawings, it is to be understood that such embodiments are merely illustrative of and not restrictive of the teachings herein. In particular, it should be recognized that the teachings herein apply to a wide variety of apparatuses and methods. It will thus be recognized that various modifications may be made to the illustrated embodiments or other embodiments, without departing from the broad scope thereof. In view of the above, it will be understood that the teachings herein are intended to cover any changes, adaptations or modifications which are within the scope of the disclosure.

What is claimed is:

1. An apparatus for removing a coupler from tubing, comprising:
- a first elongated member comprising a first proximal handle section and a first distal section, wherein:
  - the first distal section comprises a cradle member for engaging the coupler, the cradle member comprises a surface that is oriented substantially parallel to a plane that lies along a longitudinal axis of the first distal section and that is aligned substantially parallel with an axis of a pivot point for the pivotal coupling of the first and second elongated members, and
  - the cradle member defines an opening that extends to an edge of the cradle member for accepting a coupler oriented with a longitudinal axis of the coupler substantially perpendicular to the axis of the pivot point; and
- a second elongated member pivotally coupled to the first elongated member and comprising a second proximal handle section and a second distal section, wherein:
  - the second distal section comprises a clamp member for engaging the tubing,
  - the clamp member comprises a side wall that is oriented substantially parallel to a longitudinal axis of the second distal section,
  - the clamp member comprises a lower wall that extends substantially perpendicular from the side wall,
  - at least a portion of the lower wall is oriented substantially perpendicular to the longitudinal axis of the second distal section, and
  - the clamp member comprises a rotating member pivotally coupled to the side wall of the clamp member.

2. The apparatus of claim 1, wherein:
- the surface is substantially flat; and
- the opening is within the surface and extends to an edge of the surface.

3. The apparatus of claim 2, wherein the cradle member comprises a plurality of protrusions that protrude from the surface for engaging an end of the coupler.

4. The apparatus of claim 2, wherein the cradle member comprises a partially cylindrical wall that is oriented substantially perpendicular to the surface for engaging at least one side of the coupler.

5. The apparatus of claim 4, wherein the partially cylindrical wall has an inner diameter within a range of approximately ⅜ of an inch to approximately 1 inch.

6. The apparatus of claim 2, wherein the surface has an outer linear dimension within a range of approximately ½ of an inch to approximately 1 and ¼ inches.

7. The apparatus of claim 6, wherein the opening has a width within a range of approximately 5/16 of an inch to approximately ¾ of an inch.

8. The apparatus of claim 2, wherein the surface comprises a rough surface for engaging the coupler.

9. The apparatus of claim 1, wherein the lower wall comprises a rough upper surface for engaging the tubing.

10. The apparatus of claim 9, wherein the rough upper surface comprises a knurled surface.

11. The apparatus of claim 1, wherein the lower wall has a width perpendicular to the side wall within a range of approximately 3/16 of an inch to approximately 1 and ¼ inches.

12. The apparatus of claim 1, wherein the rotating member comprises a rough distal end surface for engaging the tubing.

13. The apparatus of claim 12, wherein the rough distal end surface comprises a knurled surface.

14. The apparatus of claim 1, wherein the rotating member has a width perpendicular to the side wall within a range of approximately 3/16 of an inch to approximately 1 and ¼ inches.

15. The apparatus of claim 1, further comprising a biasing member coupled between the rotating member and the side wall.

16. The apparatus of claim 15, wherein the biasing member biases a distal end of the rotating member toward an upper surface of the lower wall.

17. The apparatus of claim 15, wherein the biasing member comprises a spring.

18. The apparatus of claim 1, wherein:
- the first and second elongated members are pivotally coupled via a pivot pin; and
- the pivot pin extends through a hole in an intermediate section of the first elongated member.

19. The apparatus of claim 18, wherein a distance from the pivot pin to a distal end surface of the rotating member is within a range of approximately ½ of an inch to approximately 2 inches.

20. The apparatus of claim 18, wherein:
- the pivot pin protrudes from the intermediate section of the first elongated member; or
- the pivot pin protrudes from the intermediate section of the second elongated member.

21. The apparatus of claim 1, wherein the opening has a width within a range of approximately 5/16 of an inch to approximately ¾ of an inch.

22. The apparatus of claim 1, wherein:
- the rotating member and the side wall are pivotally coupled via a pivot pin; and
- a distance from the pivot pin to a lower edge surface of the rotating member is within a range of approximately ½ of an inch to approximately 2 inches.

23. The apparatus of claim 1, wherein:
- the first and second elongated members are pivotally coupled via a pivot pin; and
- the pivot pin extends through a hole in an intermediate section of the second elongated member.

24. The apparatus of claim 1, wherein:
- the cradle member further comprises a first arm and a second arm that extend in parallel from a third arm to define the opening;
- the surface comprises an outer surface of the first arm, an outer surface of the second arm, and an outer surface of the third arm; and
- the opening is located within an inner surface of the first arm, an inner surface of the second arm, and an inner surface of the third arm.

* * * * *